(12) United States Patent
Nakatogawa

(10) Patent No.: US 11,749,224 B2
(45) Date of Patent: Sep. 5, 2023

(54) LEVEL SHIFT CIRCUIT FOR LIQUID CRYSTAL DISPLAY SUPPRESSING INSUFFICIENT WRITING OF CONTROL ELECTRODES

(71) Applicant: Japan Display Inc., Tokyo (JP)

(72) Inventor: Hirondo Nakatogawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/655,074

(22) Filed: Mar. 16, 2022

(65) Prior Publication Data
US 2022/0301511 A1 Sep. 22, 2022

(30) Foreign Application Priority Data
Mar. 18, 2021 (JP) ................. 2021-044500

(51) Int. Cl.
*G09G 3/36* (2006.01)
*G02F 1/1368* (2006.01)
*G02F 1/1362* (2006.01)

(52) U.S. Cl.
CPC ......... *G09G 3/3677* (2013.01); *G02F 1/1368* (2013.01); *G02F 1/136286* (2013.01); *G09G 2310/0289* (2013.01)

(58) Field of Classification Search
CPC ...... G09G 3/36; G09G 3/3611; G09G 3/3614; G09G 3/3622; G09G 3/3625; G09G 3/364; G09G 3/3648; G09G 3/3674; G09G 3/3677; G09G 3/3681; G09G 3/3685; G09G 3/3688; G09G 3/3692; G09G 3/3696; G09G 2310/0289; G09G 2310/0291

USPC .................................................... 345/87–104
See application file for complete search history.

(56) References Cited

U.S. PATENT DOCUMENTS

| | | | | |
|---|---|---|---|---|
| 6,501,306 B1* | 12/2002 | Kim | ................ | H03K 19/09429 327/333 |
| 6,765,552 B2* | 7/2004 | Yamazaki | ............ | G09G 3/3677 345/98 |
| 7,521,987 B1* | 4/2009 | Cullen | ............. | H03K 19/17744 327/407 |
| 11,599,000 B2* | 3/2023 | Nakatogawa | ........ | G09G 3/3696 |
| 2001/0017608 A1* | 8/2001 | Kogure | ................ | G09G 3/3677 345/87 |
| 2003/0011584 A1 | 1/2003 | Azami et al. | | |
| 2005/0270066 A1* | 12/2005 | Kozawa | ............... | H03K 3/3565 326/81 |
| 2007/0139351 A1* | 6/2007 | Hashimoto | .......... | G09G 3/3677 257/E27.111 |

(Continued)

FOREIGN PATENT DOCUMENTS

| | | |
|---|---|---|
| JP | 2006-180033 A | 7/2006 |
| JP | 2019-174838 A | 10/2019 |
| JP | 2021-28695 A | 2/2021 |

Primary Examiner — Amit Chatly
Assistant Examiner — Nelson Lam
(74) Attorney, Agent, or Firm — Maier & Maier, PLLC

(57) ABSTRACT

According to one embodiment, a level shift circuit includes a first input terminal, a second input terminal, an output terminal, a first level shift unit, a first inverter, a second level shift unit, a second inverter, and first to fourth switching elements. The first level shift unit outputs a first output voltage and a reference voltage. The second level shift unit outputs the reference voltage and a second output voltage.

17 Claims, 18 Drawing Sheets

(56) References Cited

U.S. PATENT DOCUMENTS

| | | | |
|---|---|---|---|
| 2009/0033850 A1* | 2/2009 | Ishiguro | G02F 1/13338 349/116 |
| 2011/0037503 A1* | 2/2011 | Shiah | H03K 19/018528 327/108 |
| 2012/0229164 A1* | 9/2012 | Taguchi | H03K 19/09429 326/81 |
| 2012/0299631 A1* | 11/2012 | Duby | H03K 3/356113 327/333 |
| 2017/0237439 A1* | 8/2017 | Ghosh | H03K 19/018521 327/333 |
| 2018/0013444 A1* | 1/2018 | Kim | H03K 19/018521 |

* cited by examiner

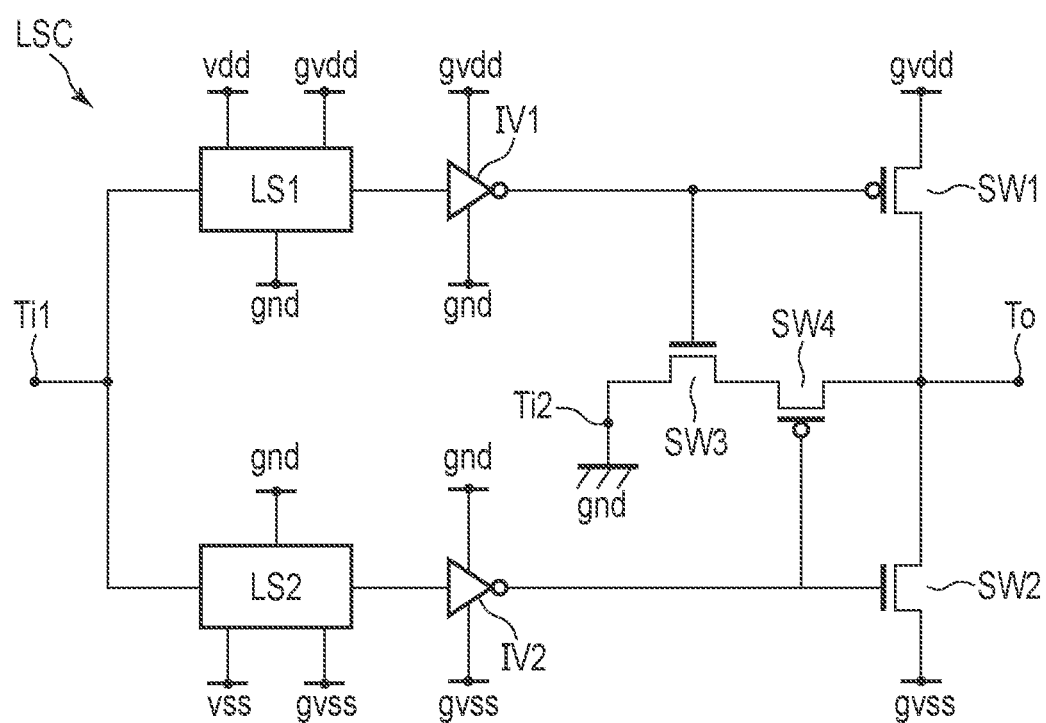
F I G. 12

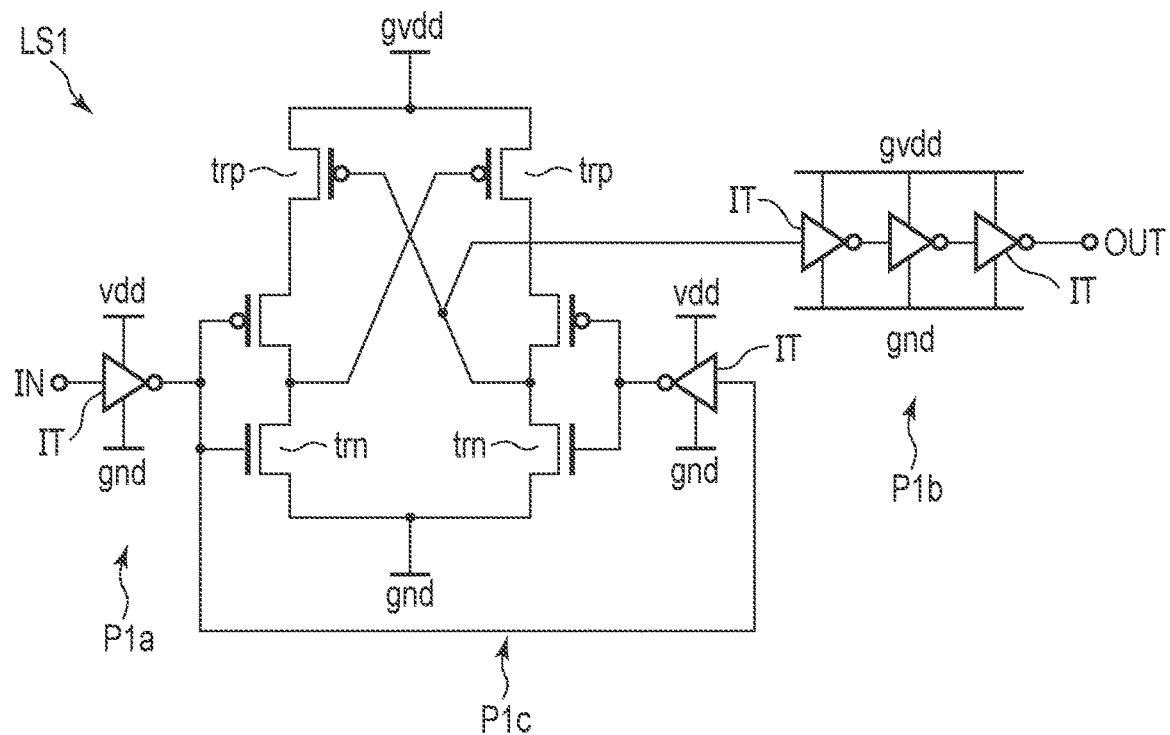
F I G. 13
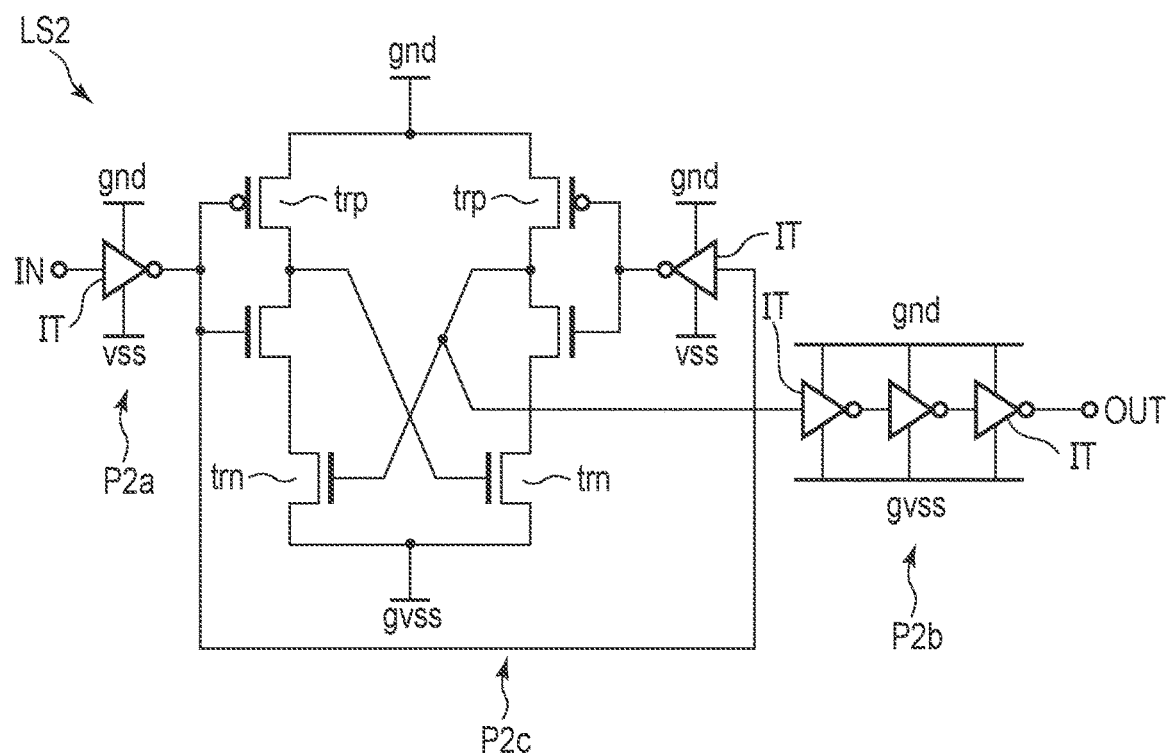
F I G. 14

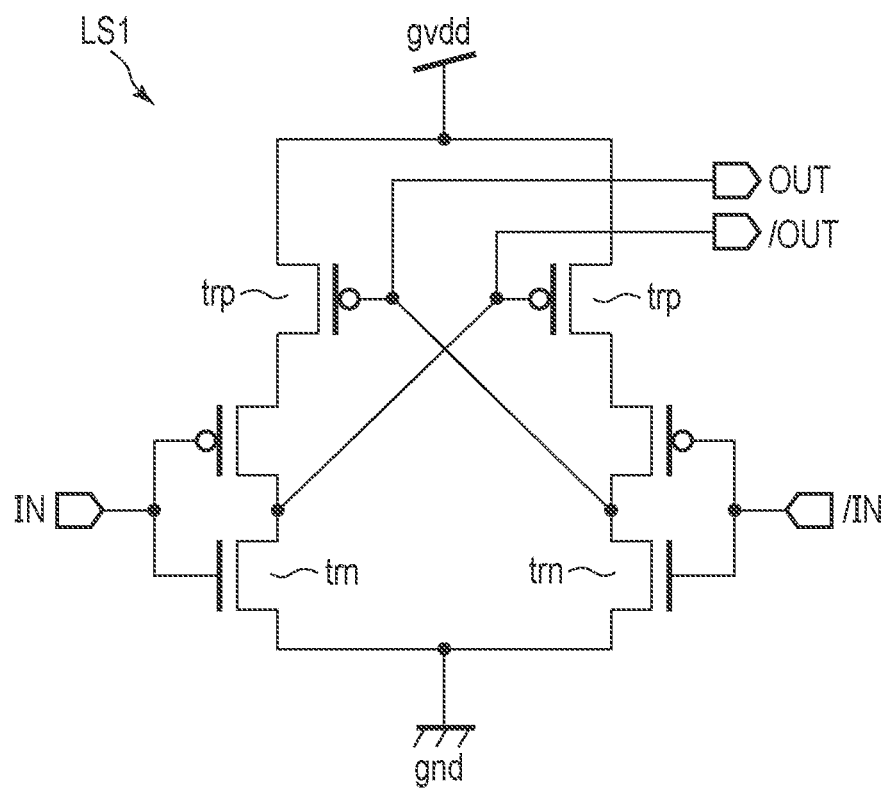
F I G. 15

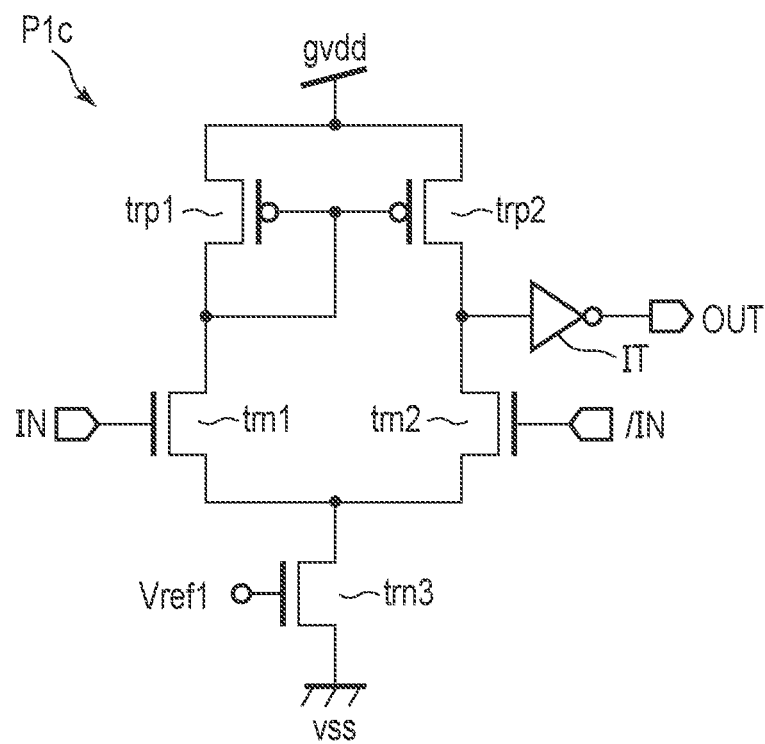
F I G. 18
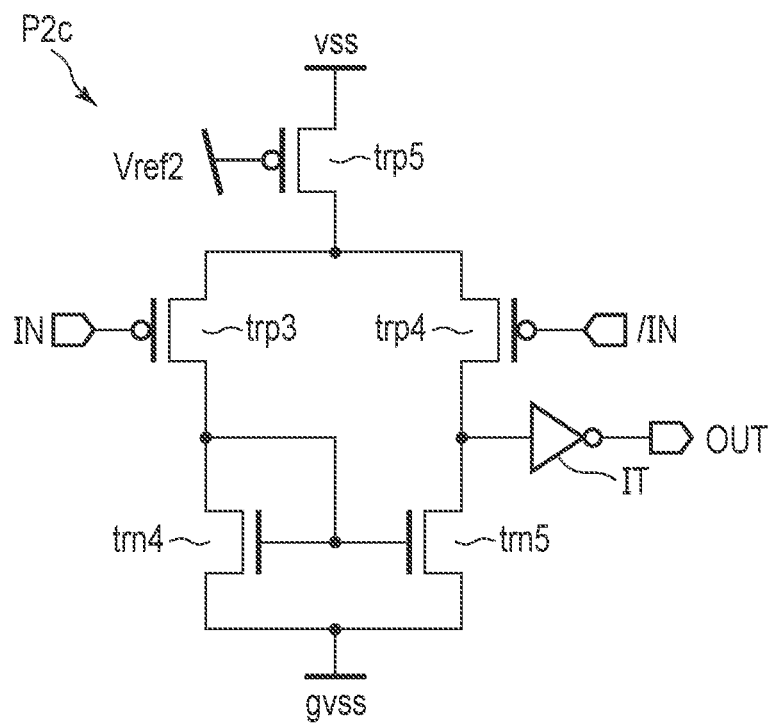
F I G. 19

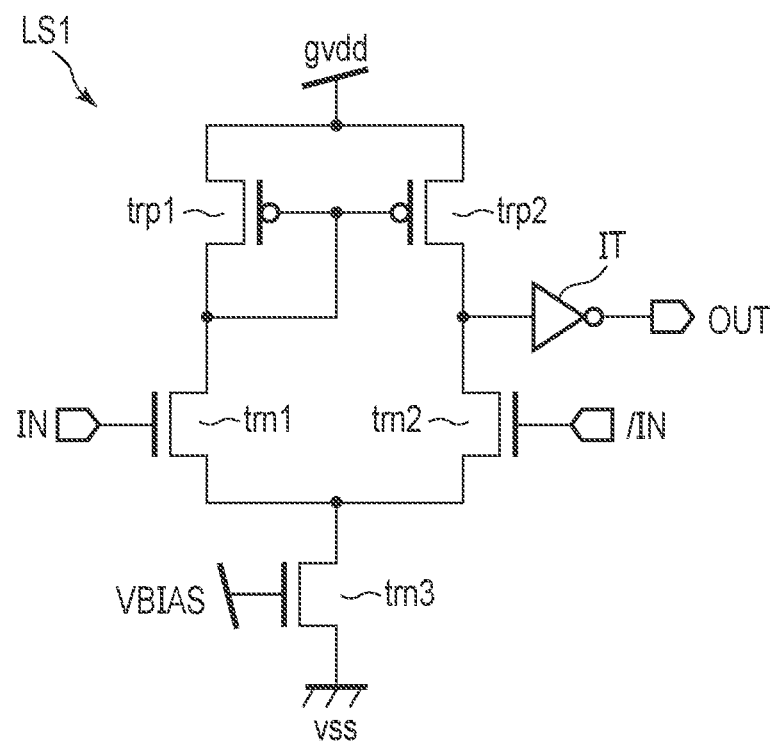
F I G. 20
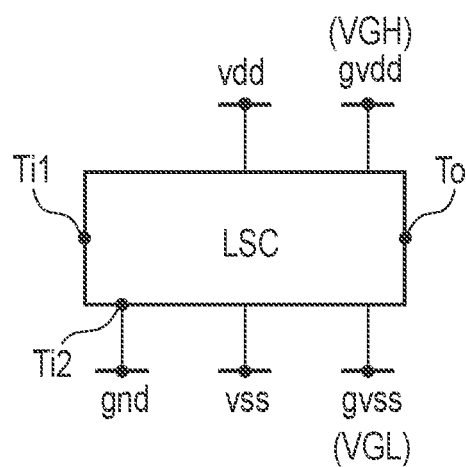
F I G. 21

US 11,749,224 B2

LEVEL SHIFT CIRCUIT FOR LIQUID CRYSTAL DISPLAY SUPPRESSING INSUFFICIENT WRITING OF CONTROL ELECTRODES

CROSS-REFERENCE TO RELATED APPLICATIONS

This application is based upon and claims the benefit of priority from Japanese Patent Application No. 2021-044500, filed Mar. 18, 2021, the entire contents of which are incorporated herein by reference.

FIELD

Embodiments described herein relate generally to a level shift circuit, a display panel, and an electronic device.

BACKGROUND

For example, liquid crystal display devices are known as display devices. The liquid crystal display device comprises a liquid crystal display panel as a display panel. The liquid crystal display panel comprises a plurality of pixels, a plurality of scanning lines, a plurality of signal lines, a signal line driving circuit connected to the plurality of signal lines, and the like. The plurality of pixels are provided in the display area. Each of the pixels comprises a thin-film transistor (TFT) and a pixel electrode connected to the TFT.

The signal line driving circuit is a driver IC formed by an integrated circuit (IC) chip. The signal line driving circuit outputs video signals to the signal lines. When the TFT is turned on in each of the pixels, the signal line driving circuit can write the video signal to the pixel electrode via the signal line and TFT.

A control signal to activate the signal line driving circuit has a low voltage. For this reason, the signal line driving circuit outputs the video signals of a low voltage level to the signal lines, for example, video signals having a voltage value within a range of, for example, −5V to +5V to the signal lines. The plurality of pixels can be driven by polarity inversion drive and the liquid crystal display panel can perform multi-gradation display in the display area, by using the above-described signal line driving circuit.

In addition, the liquid crystal display panel may comprise electrodes other than the pixel electrodes, as disclosed in JP 2021-028695 A.

BRIEF DESCRIPTION OF THE DRAWINGS

FIG. 12 is a circuit diagram showing the level shift circuit.

FIG. 13 is a circuit diagram showing a first level shift unit shown in FIG. 12.

FIG. 14 is a circuit diagram showing a second level shift unit shown in FIG. 12.

FIG. 15 is a circuit diagram showing a part of the level shift circuit according to modified example 1 of the embodiment, illustrating a first level shift unit.

FIG. 18 is a circuit diagram showing a part of the level shift circuit according to modified example 3 of the embodiment, illustrating a main part of the first level shift unit.

FIG. 19 is a circuit diagram showing a part of the level shift circuit according to modified example 3 of the embodiment, illustrating a main part of the second level shift unit.

FIG. 20 is a circuit diagram showing a part of the level shift circuit according to modified example 4 of the embodiment, illustrating the first level shift unit.

FIG. 21 is a circuit diagram showing the level shift circuit according to modified example 5 of the embodiment.

DETAILED DESCRIPTION

Figure 1:
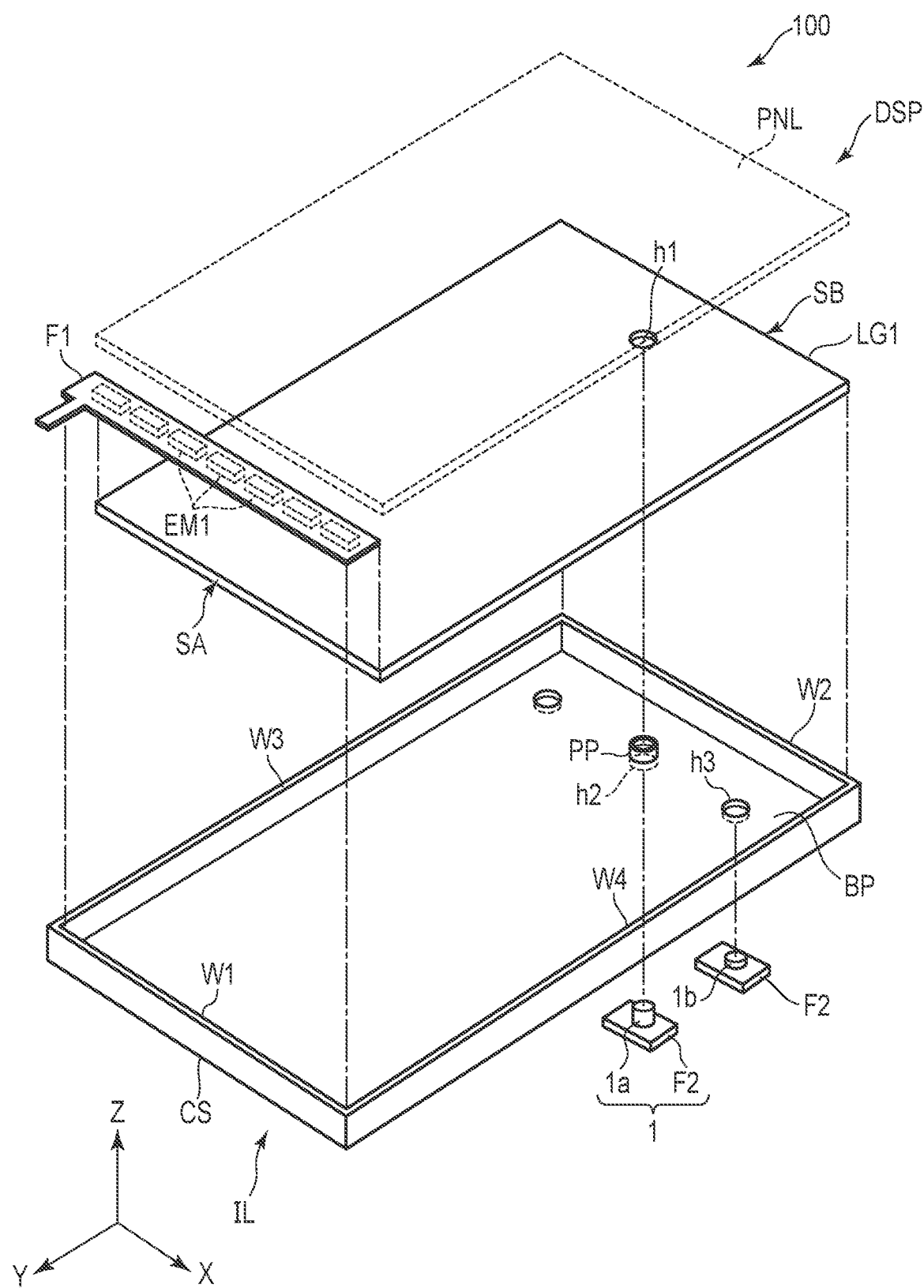
FIG. 1 is an exploded perspective showing a configuration example of an electronic device according to one of embodiments.

In general, according to one embodiment, there is provided a level shift circuit comprising: a first input terminal; a second input terminal; an output terminal; a first level shift unit which, when a first power supply voltage more positive than a reference voltage is input from the first input terminal, outputs a first output voltage more positive than the reference voltage and which, when the reference voltage or a second power supply voltage more negative than the reference voltage is input from the first input terminal, outputs the reference voltage; a first inverter which outputs the reference voltage when the first output voltage is input from the first level shift unit and which outputs the first output voltage when the reference voltage is input from the first level shift unit; a first switching element which permits the first output voltage to be output to the output terminal when the reference voltage is input from the first inverter and which prohibits the first output voltage to be output to the output terminal when the first output voltage is input from the first inverter; a second level shift unit which outputs the reference voltage when the reference voltage or the first power supply voltage is input from the first input terminal and which outputs a second output voltage more negative than the reference voltage when the second power supply voltage is input from the first input terminal; a second inverter which outputs the second output voltage when the reference voltage is input from the second level shift unit and which outputs the reference voltage when the second output voltage is input from the second level shift unit; a second switching element which permits the second output voltage to be output to the output terminal when the reference voltage is input from the second inverter and which prohibits the second output voltage to be output to the output terminal when the second output voltage is input from the second inverter; a third switching element which is connected between the second input terminal and the output terminal, which permits the reference voltage to be output from the second input terminal to the output terminal when the first output voltage is input from the first inverter, and which prohibits the reference voltage to be output from the second input terminal to the output terminal when the reference voltage is input from the first inverter; and a fourth switching element which is serially connected between the second input terminal and the output terminal together with the third switching element, which permits the reference voltage to be output from the second input terminal to the output terminal when the second output voltage is input from the second inverter, and which prohibits the reference voltage to be output from the second input terminal to the output terminal when the reference voltage is input from the second inverter.

According to another embodiment, there is provided a display panel comprising: a plurality of scanning lines; a plurality of signal lines; a control switching element connected to a corresponding scanning line of the plurality of scanning lines and a corresponding signal line of the plurality of signal lines; a control electrode; and a level shift circuit connected between the control switching element and the control electrode. The level shift circuit comprises: a first input terminal connected to the control switching element; a second input terminal; an output terminal connected to the control electrode; a first level shift unit which, when a first power supply voltage more positive than a reference voltage is input from the first input terminal, outputs a first output voltage more positive than the reference voltage and which, when the reference voltage or a second power supply voltage more negative than the reference voltage is input from the first input terminal, outputs the reference voltage; a first inverter which outputs the reference voltage when the first output voltage is input from the first level shift unit and which outputs the first output voltage when the reference voltage is input from the first level shift unit; a first switching element which permits the first output voltage to be output to the output terminal when the reference voltage is input from the first inverter and which prohibits the first output voltage to be output to the output terminal when the first output voltage is input from the first inverter; a second level shift unit which outputs the reference voltage when the reference voltage or the first power supply voltage is input from the first input terminal and which outputs a second output voltage more negative than the reference voltage when the second power supply voltage is input from the first input terminal; a second inverter which outputs the second output voltage when the reference voltage is input from the second level shift unit and which outputs the reference voltage when the second output voltage is input from the second level shift unit; a second switching element which permits the second output voltage to be output to the output terminal when the reference voltage is input from the second inverter and which prohibits the second output voltage to be output to the output terminal when the second output voltage is input from the second inverter; a third switching element which is connected between the second input terminal and the output terminal, which permits the reference voltage to be output from the second input terminal to the output terminal when the first output voltage is input from the first inverter, and which prohibits the reference voltage to be output from the second input terminal to the output terminal when the reference voltage is input from the first inverter; and a fourth switching element which is serially connected between the second input terminal and the output terminal together with the third switching element, which permits the reference voltage to be output from the second input terminal to the output terminal when the second output voltage is input from the second inverter, and which prohibits the reference voltage to be output from the second input terminal to the output terminal when the reference voltage is input from the second inverter.

According to yet another embodiment, there is provided an electronic device comprising: a display panel comprising a plurality of scanning lines, a plurality of signal lines, an incident light control area, a control switching element connected to one corresponding scanning line of the plurality of scanning lines and one corresponding signal line of the plurality of signal lines, a control electrode located in the incident light control area, and a level shift circuit connected to the control switching element and the control electrode; and an imaging device acquiring information of light transmitted through the incident light control area of the display panel. The level shift circuit comprises: a first input terminal connected to the control switching element; a second input terminal; an output terminal connected to the control electrode; a first level shift unit which, when a first power supply voltage more positive than a reference voltage is input from the first input terminal, outputs a first output voltage more positive than the reference voltage and which, when the reference voltage or a second power supply voltage more negative than the reference voltage is input from the first input terminal, outputs the reference voltage; a first inverter which outputs the reference voltage when the first output voltage is input from the first level shift unit and which outputs the first output voltage when the reference voltage is input from the first level shift unit; a first switching element which permits the first output voltage to be output to the output terminal when the reference voltage is input from the first inverter and which prohibits the first output voltage to be output to the output terminal when the first output voltage is input from the first inverter; a second level shift unit which outputs the reference voltage when the reference voltage or the first power supply voltage is input from the first input terminal and which outputs a second output voltage more negative than the reference voltage when the second power supply voltage is input from the first input terminal; a second inverter which outputs the second output voltage when the reference voltage is input from the second level shift unit and which outputs the reference voltage when the second output voltage is input from the second level shift unit; a second switching element which permits the second output voltage to be output to the output terminal when the reference voltage is input from the second inverter and which prohibits the second output voltage to be output to the output terminal when the second output voltage is input from the second inverter; a third switching element which is connected between the second input terminal and the output terminal, which permits the reference voltage to be output from the second input terminal to the output terminal when the first output voltage is input from the first inverter, and which prohibits the reference voltage to be output from the second input terminal to the output terminal when the reference voltage is input from the first inverter; and a fourth switching element which is serially connected between the second input terminal and the output terminal together with the third switching element, which permits the reference voltage to be output from the second input terminal to the output terminal when the second output voltage is input from the second inverter, and which prohibits the reference voltage to be output from the second input terminal to the output terminal when the reference voltage is input from the second inverter.

Embodiments and modified examples will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

Embodiment

First, one of the embodiments will be described. FIG. 1 is an exploded perspective showing a configuration example of an electronic device 100 according to the embodiment.

As shown in FIG. 1, the direction X, the direction Y, and the direction Z are orthogonal to each other but may intersect at an angle other than 90 degrees.

The electronic device 100 comprises a liquid crystal display device DSP serving as a display device and a camera 1 serving as an imaging device. The liquid crystal display device DSP comprises a liquid crystal display panel PNL serving as a display panel and an illumination device (backlight) IL. The camera unit 1 is configured such that a camera (camera module) 1a serving as a first camera is mounted on a wiring substrate F2. In the present embodiment, all of cameras 1b serving as second cameras are not shown in the figure, but the electronic device 100 further comprises two cameras 1b. Incidentally, the camera 1 may include the only camera 1a.

The illumination device IL comprises light guides LG1, a light source EM1, and a casing CS. The illumination device IL illuminates, for example, the liquid crystal display panel PNL simply represented by a dashed line in FIG. 1.

The light guide LG1 is formed in a flat panel shape parallel to an X-Y plane defined by the directions X and Y. The light guide LG1 is opposed to the liquid crystal display panel PNL. The light guide LG1 has a side surface SA, a side surface SB on the side opposite to the side surface SA, and a through hole h1 surrounding the camera 1a. The light guide LG1 is opposed to a plurality of cameras 1b. Each of the side surfaces SA and SB extends in the direction X. For example, the side surfaces SA and SB are planes parallel to an X-Z plane defined by the directions X and Z. The through hole h1 penetrates the light guide LG1 in the direction Z. The through hole h1 is located between the side surfaces SA and SB and is closer to the side surface SB than to the side surface SA, in the direction Y.

A plurality of light sources EM1 are arranged at intervals in the direction X. Each of the light sources EM1 is mounted on a wiring substrate F1 and is electrically connected to the wiring substrate F1. For example, the light source EM1 is a light-emitting diode (LED), which emits white illumination light. The illumination light emitted from the light sources EM1 is made incident on the light guide LG1 from the side surface SA to travel inside the light guide LG1 from the side surface SA toward the side surface SB.

The casing CS accommodates the light guide LG1 and the light sources EM1. The casing CS has side walls W1 to W4, a bottom plate BP, a through hole h2, a protrusion PP, and through holes h3. The side walls W1 and W2 extend in the direction X and are opposed in the direction Y. The side walls W3 and W4 extend in the direction Y and are opposed in the direction X. The through hole h2 overlaps the through hole h1 in the direction Z. The protrusion PP is fixed to the bottom plate BP. The protrusion PP protrudes from the bottom plate BP toward the liquid crystal display panel PNL in the direction Z and surrounds the through hole h2.

In the present embodiment, the casing CS includes two through holes h3, which is the same number as the cameras 1b. The through holes h3 are formed to penetrate the bottom plate BP in the direction Z. The plurality of through holes h3 are provided to be dispersed together with the through hole h2 in planar view. In addition, when the bottom plate BP is formed of a material that allows infrared light to be transmitted, the through holes h3 does not need to be formed in the bottom plate BP. Otherwise, it is desirable to form the through hole h3 in the bottom plate BP and surround the cameras 1b with the through holes h3, from the viewpoint of reducing the thickness of the electronic device 100 in the direction Z.

The light guide LG1 overlaps the liquid crystal display panel PNL.

The cameras 1a and 1b are mounted on the wiring substrates F2 and electrically connected to the wiring substrates F2. The camera 1a is opposed to the liquid crystal display panel PNL through the through hole h2, the inside of the protrusion PP, and the through hole h1. The cameras 1b are opposed to the light guide LG1 through the through holes h3.

Figure 2:
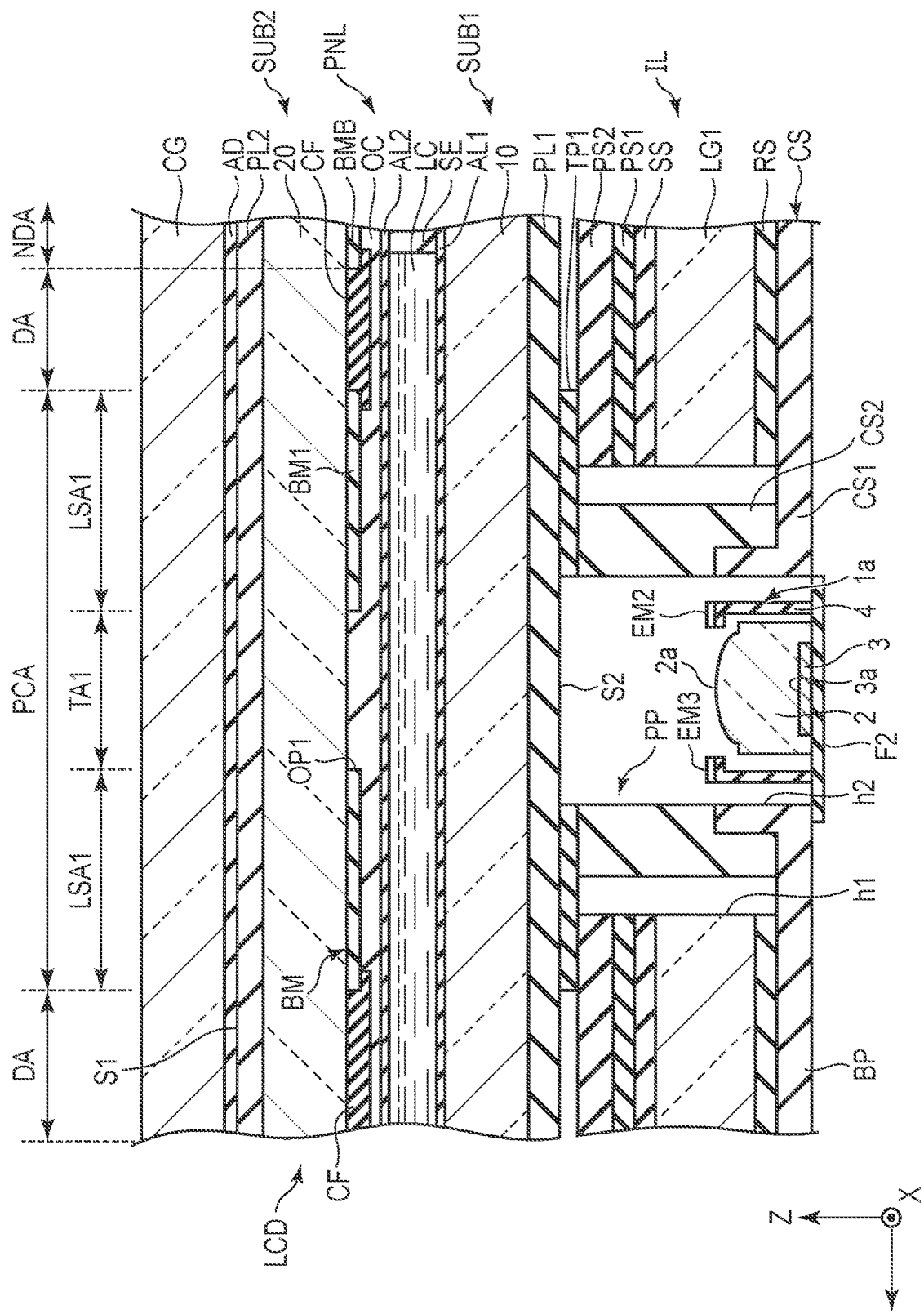
FIG. 2 is a cross-sectional view showing a surrounding of a camera of the electronic device.

FIG. 2 is a cross-sectional view showing a surrounding of the camera 1a of the electronic device 100.

As shown in FIG. 2, the illumination device IL further comprises a light reflective sheet RS, a light diffusion sheet SS, and prism sheets PS1 and PS2.

The light reflective sheet RS, the light guide LG1, the light diffusion sheet SS, the prism sheet PS1, and the prism sheet PS2 are arranged in this order in the direction Z and are accommodated in the casing CS. The casing CS comprises a metallic casing CS1 and a light-shielding wall CS2 formed of resin which serves as a peripheral member. The light-shielding wall CS2 is adjacent to the camera 1a to form the protrusion PP together with the casing CS1. The light-shielding wall CS2 is located between the camera 1a and the light guide LG1 and has a cylindrical shape. The light-shielding wall CS2 is formed of resin such as black resin, which absorbs light. Each of the light diffusion sheet SS, the prism sheet PS1, and the prism sheet PS2 includes a through hole which overlaps the through hole h1. The protrusion PP is located inside the through hole h1.

The liquid crystal display panel PNL further comprises a polarizer PL1 and a polarizer PL2. The liquid crystal display panel PNL and a cover glass CG serving as a cover member are arranged in the direction Z and constitute a liquid crystal element LCD comprising an optical switch function for the light traveling in the direction Z. The liquid crystal element LCD is stuck to the illumination device IL by an adhesive tape TP1. The adhesive tape TP1 is stuck to the protrusion PP, the prism sheet PS2, and the polarizer PL1.

The liquid crystal display panel PNL may have a configuration corresponding to any one of a display mode using a lateral electric field along the main surface of the substrate, a display mode using a longitudinal electric field along the normal of the main surface of the substrate, a display mode using an inclined electric field which is tilted obliquely with respect to the main surface of the substrate, and a display mode using an appropriate combination of the above lateral electric field, longitudinal electric field, and inclined electric field. The main surface of the substrate here is a surface parallel to the X-Y plane.

The liquid crystal display panel PNL comprises a display area DA where an image is displayed, a non-display area NDA located outside the display area DA, and an incident light control area PCA surrounded by the display area DA and having a circular shape. The liquid crystal display panel PNL comprises a first substrate SUB1, a second substrate SUB2, a liquid crystal layer LC, and a sealing member SE. The sealing member SE is located in the non-display area NDA to join the first substrate SUB1 and the second substrate SUB2. The liquid crystal layer LC is located in the display area DA and the incident light control area PCA and is held between the first substrate SUB1 and the second substrate SUB2. The liquid crystal layer LC is formed in a space surrounded by the first substrate SUB1, the second substrate SUB2 and the sealing member SE.

An image is displayed on the display area DA when the liquid crystal display panel PNL controls the quantity of transmitted light emitted from the illumination device IL. The user of the electronic device 100 is located on the Z-directional side of the cover glass CG (i.e., upper side in the figure) and observes the light emitted from the liquid crystal display panel PNL as an image.

In contrast, the quantity of the transmitted light is also controlled by the liquid crystal display panel PNL in the incident light control area PCA, and the light is made incident on the camera 1a from the Z-directional side of the cover glass CC through the liquid crystal display panel PNL.

In the present specification, the light traveling from the illumination device IL to the cover glass CG side through the liquid crystal display panel PNL is referred to as emitted light, and the light traveling from the cover glass CG side to the camera 1 through the liquid crystal display panel PNL is referred to as incident light.

Main parts of the first substrate SUB1 and the second substrate SUB2 will be hereinafter described.

The first substrate SUB1 comprises an insulating substrate 10 and an alignment film AL1. The second substrate SUB2 comprises an insulating substrate 20, a color filter CF, a light-shielding layer BM, a transparent layer OC, and an alignment film AL2.

The insulating substrates 10 and 20 are transparent substrates such as glass substrates or flexible resin substrates. The alignment films AL1 and AL2 are in contact with the liquid crystal layer LC.

The color filter CF, the light-shielding layer BM, and the transparent layer OC are located between the insulating substrate 20 and the liquid crystal layer LC. In the example illustrated, the color filter CF is provided on the second substrate SUB2, but may be provided on the first substrate SUB1. The color filter CF is located in the display area DA.

The incident light control area PCA includes at least a first light-shielding area LSA1 located in the outermost periphery and having an annular shape, and a first incident light control area TA1 surrounded by the first light-shielding area LSA1 so as to be in contact with the first light-shielding area LSA1.

The light-shielding layer BM includes a light-shielding portion located in the display area DA to partition pixels and a frame-shaped light-shielding portion BMB located in the non-display portion NDA. In the incident light control area PCA, the light-shielding layer BM includes at least a first light-shielding portion BM1 located in the first light-shielding area LSA1 and having an annular shape, and a first opening OP1 located in the first incident light control area TA1.

A boundary between the display area DA and the non-display area NDA is defined by, for example, an inner edge (edge part of the display area DA side) of the light-shielding portion BMB. The sealing member SE overlaps the light-shielding portion BMB.

The transparent layer OC is in contact with the color filter CF in the display area DA, with the light-shielding portion BMB in the non-display area NDA, with the first light-shielding portion BM1 in the first light-shielding area LSA1, and with the insulating substrate 20 in the first incident light control area TA1. The alignment films AL1 and AL2 are provided across the display area DA, the incident light control area PCA, and the non-display area NDA.

The detailed descriptions of the color filter CF are omitted here, but the color filter CF comprises, for example, a red colored layer arranged at a red pixel, a green colored layer arranged at a green pixel, and a blue colored layer arranged at a blue pixel. In addition, the color filter CF often comprises a transparent resin layer arranged at a white pixel. The transparent layer OC covers the color filter CF and the light-shielding layer BM. For example, the transparent layer OC is a transparent organic insulating layer.

The camera 1a is located inside the through hole h2 of the casing CS. The camera 1a overlaps the cover glass CG and the liquid crystal display panel PNL in the direction Z. Incidentally, the liquid crystal display panel PNL may further comprise an optical sheet other than the polarizers PL1 and PL2, in the incident light control area PCA. Examples of the optical sheet are a retardation film, a light scattering layer, an antireflective layer and the like. In the electronic device 100 comprising the liquid crystal display panel PNL, the camera 1a, and the like, the camera 1a is provided on a back side of the liquid crystal display panel PNL as viewed from the user of the electronic device 100.

For example, the camera 1a comprises an optical system 2 including at least one lens, an imaging device (image sensor) 3, and a casing 4. The imaging device 3 includes an imaging surface 3a which faces the liquid crystal display panel PNL side. The optical system 2 is opposed to the incident light control area PCA of the liquid crystal display panel PNL. The optical system 2 is located between the imaging surface 3a and the liquid crystal display panel PNL, and includes a light-entering surface 2a which faces the liquid crystal display panel PNL side. The light-entering surface 2a overlaps the incident light control area PCA. The optical system 2 is located to be spaced apart from the liquid crystal display panel PNL. The casing 4 accommodates the optical system 2 and the imaging device 3.

A light source EM2 serving as a first light source and a light source EM3 serving as a second light source are arranged in the upper part of the casing 4. The light source EM2 is configured to emit infrared light to the liquid crystal display panel PNL side. The light source EM3 is configured to emit visible light to the liquid crystal display panel PNL side. The light sources EM2 and EM3 are provided for the purpose of illuminating a subject to be captured by the camera 1a.

The camera 1a acquires information of the light transmitted through the incident light control area PCA of the liquid crystal display panel PNL. The imaging device 3 of the camera 1a receives light through the cover glass CG, the liquid crystal display panel PNL, and the optical system 2. The imaging device 3 is configured to convert the light transmitted through the incident light control area PCA of the liquid crystal display panel PNL, the optical system 2, and the like into image data. For example, the camera 1a receives visible light (for example, light having a wavelength range of 400 nm to 700 nm) transmitted through the cover glass CG and the liquid crystal display panel PNL. In addition, the camera can also receive infrared light (for example, light having a wavelength range of 800 nm to 1500 nm) as well as visible light.

Incidentally, the cameras 1b are different from the camera 1a in that they do not include the light sources EM3. The cameras 1b are opposed to the light reflective sheet RS through the through holes h3 (FIG. 1). The cameras 1b can receive infrared light through the cover glass CG, the liquid crystal display panel PNL, the prism sheet PS2, the prism sheet PS1, the light diffusion sheet SS, the light guide LG1, the light reflective sheet RS, and the optical system 2. The light reflective sheet RS has a hole in the light reflective sheet at the position where it overlaps the infrared (IR) sensor. However, when the light reflective sheet is thin enough to allow IR transmission, the light reflective sheet does not need to include a hole, and infrared light transmitted through the light reflective sheet may be received by the IR sensor. In this case, the adverse effect on the visibility of the image can be reduced. In addition, the camera 1b can be accommodated in the through hole h1 of the light guide LG1 and the through hole h2 of the bottom plate BP, similarly to the camera 1a.

The polarizer PL1 is bonded to the insulating substrate 10. The polarizer PL2 is bonded to the insulating substrate 20. The cover glass CG is stuck to the polarizer PL2 by a transparent adhesive layer AD.

In addition, a transparent conductive layer may be provided between the polarizer PL2 and the insulating substrate 20 to prevent the liquid crystal layer LC from being affected by an electric field from the outside, and the like. The transparent conductive layer is formed of a transparent conductive material such as indium tin oxide (ITO) or indium zinc oxide (IZO).

In addition, an ultra-birefringent film can be included in the polarizer PL1 or PL2. It is known that the ultra-birefringent film makes the transmitted light non-polarized (change to natural light) when linearly polarized light is made incident, and a subject can be captured without uncomfortable feeling even if the subject includes an element which emits polarized light. For example, when the electronic device 100 or the like is reflected in a subject of the camera 1a, the luminance of the electronic device 100 in the subject made incident on the camera 1a may be varied due to a relationship between the polarizers PL1 and PL2, and the angle made between the electronic device 100 which is the subject and the polarizers, and an uncomfortable feeling may be made at imaging, since the linearly polarized light is emitted from the electronic device 100. However, the variation in the luminance that causes the uncomfortable feeling can be suppressed by providing the ultra-birefringent films in the polarizers PL1 and PL2.

As a film exhibiting the ultra-birefringence, for example, COSMOSHINE manufactured by TOYOBO CO., LTD., is preferably used. The ultra-birefringence means in-plane retardation of higher than or equal to 800 nm to light in the visible range, for example, 500 nm.

The liquid crystal display panel PNL has a first surface S1 on the image display side and a second surface S2 on the side opposite to the first surface S1. In the present embodiment, the polarizer PL2 has the first surface S1, and the polarizer PL1 has the second surface S2.

The light sources EM2 and EM3 are located on the second surface S2 side of the liquid crystal display panel PNL.

The display area DA, the incident light control area PCA, and an emitted light control area ICA to be described later are the areas overlapping the first substrate SUB1, the second substrate SUB2, and the liquid crystal layer LC, respectively.

Figure 3:
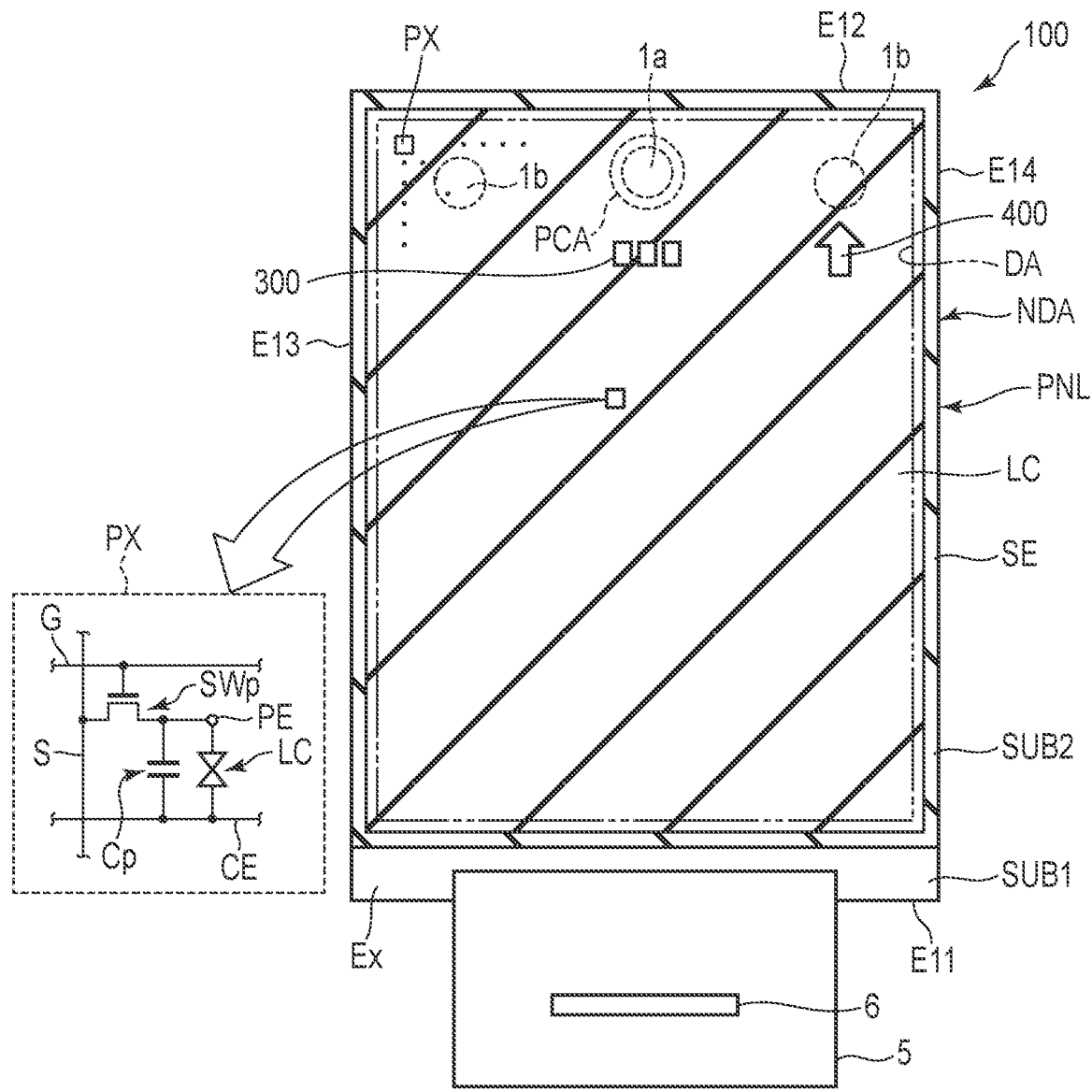
FIG. 3 is a plan view showing arrangement and the like of the liquid crystal display panel shown in FIG. 2 and a plurality of cameras together with an equivalent circuit of one pixel.

FIG. 3 is a plan view showing arrangement of the liquid crystal display panel PNL and the plurality of cameras 1a and 1b shown in FIG. 2, and the like, together with an equivalent circuit of one pixel PX. In FIG. 3, the liquid crystal layer LC and the sealing member SE are represented by different hatch lines.

As shown in FIG. 3, the display area DA is a substantially quadrangular area but four corners thereof may be rounded, and the area may be shaped in a polygon other than a quadrangle or a circle. The display area DA is surrounded by the sealing member SE.

The liquid crystal display panel PNL has a pair of shorter sides E11 and E12 extending in the direction X and a pair of longer sides E13 and E14 extending in the direction Y. The liquid crystal display panel PNL comprises a plurality of pixels PX arrayed in a matrix in the direction X and the direction Y, in the display area DA. The pixels PX in the display area DA have the same circuit configuration. As shown and enlarged in FIG. 3, each pixel PX comprises a pixel switching element SWp, a pixel electrode PE, a common electrode CE, a liquid crystal layer LC and the like.

The pixel switching element SWp is composed of, for example, a thin-film transistor (TFT). The pixel switching element SWp is electrically connected to a corresponding scanning line G of a plurality of scanning lines G, and a corresponding signal line S of a plurality of signal lines S. The pixel electrode PE is electrically connected to the pixel switching element SWp. A control signal to control the pixel switching element SWp is supplied to the scanning line G. An image signal such as a video signal is supplied to the signal line S as a signal different from the control signal. A common voltage is supplied to the common electrode CE. The liquid crystal layer LC is driven with a voltage (electric field) generated between the pixel electrode PE and the common electrode CE. For example, a capacitor Cp is formed between an electrode having the same potential as the common electrode CE and an electrode having the same potential as the pixel electrode PE.

The electronic device 100 further comprises a wiring substrate 5 and an IC chip 6.

The wiring substrate 5 is mounted on an extending portion Ex of the first substrate SUB1 and is coupled to the extending portion Ex. The IC chip 6 is mounted on the wiring substrate 5 and is electrically connected to the wiring substrate 5. Incidentally, the IC chip 6 may be mounted on the extending portion Ex and electrically connected to the extending portion Ex. The IC chip 6 incorporates, for example, a display driver which outputs a signal necessary for image display, and the like. The wiring substrate 5 may be a foldable flexible printed circuit.

In FIG. 3, the electronic device 100 comprises three cameras 1 in the display area DA. Among them, the incident light control area PCA is formed to overlap the camera 1a in the upper center of the figure. Incidentally, the incident light control area PCA includes an outer periphery adjacent to the display area DA. Normal pixels PX overlap other cameras 1b, and normal display is performed in pixels PX overlapping the cameras 1b.

Since the polarizer PL1 and the polarizer PL2 have high transmittance in the infrared light wavelength range and allow infrared light to be transmitted, infrared light can be received by the cameras 1a and 1b even if the pixels PX overlap the cameras 1a and 1b. The user can use the electronic device 100 without being aware of the positions of the cameras 1b by executing normal display at the pixels PX that overlap the cameras 1b. In addition, since the area of the display area DA is not reduced, a large number of cameras 1b can be arranged. In addition, the user is not made aware of the fact that a large number of cameras 1b are arranged. In particular, when the electronic device 100 is used in an automatic teller machine (ATM) or the like, recognizing the presence of the cameras 1b can be made more difficult for the user by arranging the cameras 1b at parts fixed to the black display.

Reference numeral 300 denotes an indicator, which can intuitively notify the user of the states of the cameras 1a and 1b. For example, in the fingerprint authentication or the like, the user can be notified of an optimum position of the finger by the indicator 300. In addition, arrow 400 indicates a mark that is displayed when the user dares to be notified of the position of the camera 1b. The displayed figure is not limited to the arrow 400, but an appropriate shape, which surrounds a periphery of the camera 1b in a circular shape, can be selected.

Figure 4:
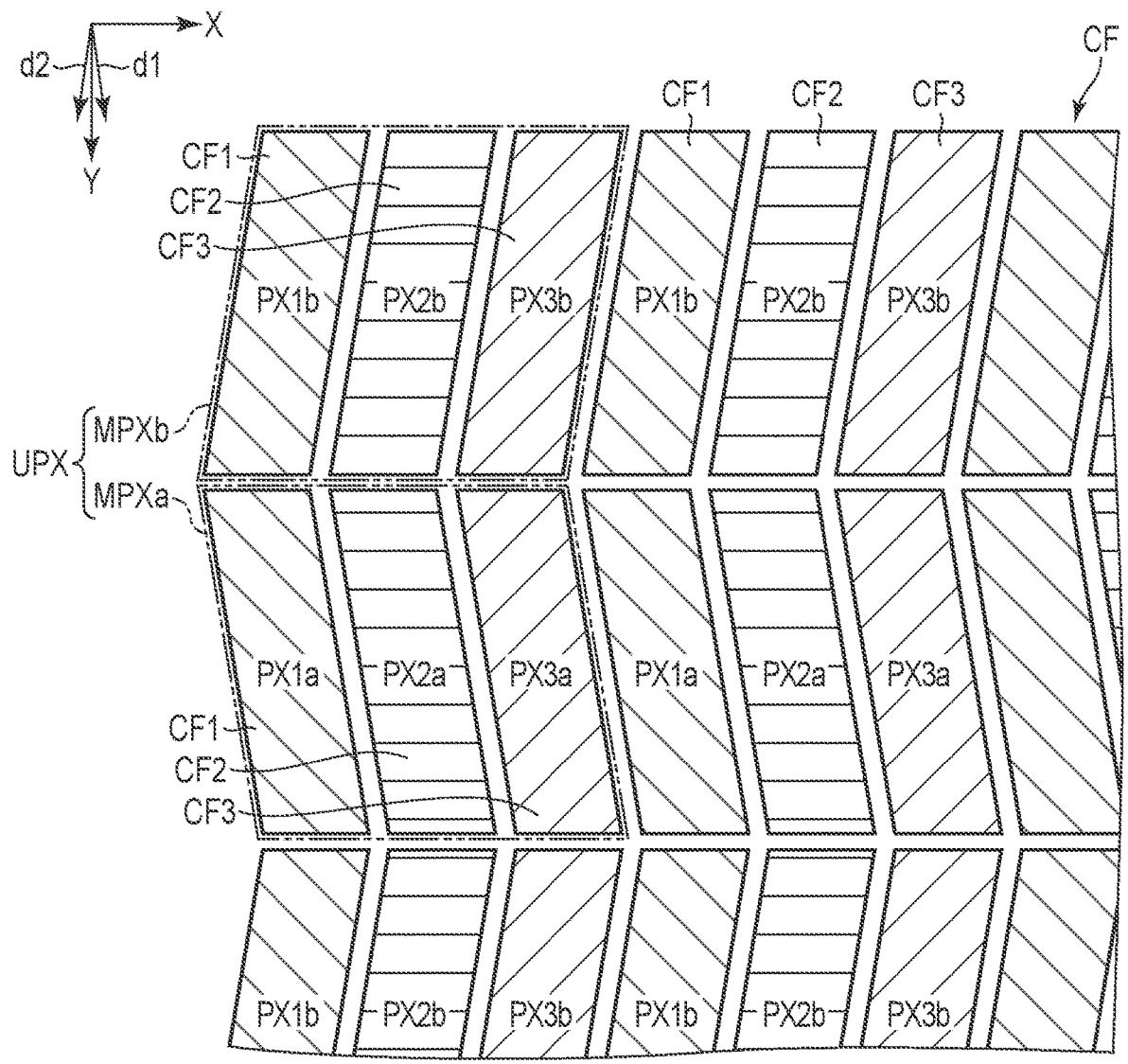
FIG. 4 is a plan view showing an array of pixels on the liquid crystal display panel.

FIG. 4 is a plan view showing the array of the pixels PX on the liquid crystal display panel PNL.

As shown in FIG. 4, each of main pixels MPX is composed of a plurality of pixels PX. The plurality of main pixels MPX are classified into two types of main pixels MPXa and MPXb. Two main pixels MPXa and MPXb adjacent in the direction Y constitute a unit pixel UPX. Each of the main pixels MPXa and MPXb corresponds to a minimum unit for displaying a color image. The main pixel MPXa includes pixels PX1a, PX2a, and PX3a. The main pixel MPXb includes pixels PX1b, PX2b, and PX3b. In addition, the shape of the above pixel PX is an approximate parallelogram as shown in the figure.

Each of the main pixels MPXa and MPXb includes multicolor pixels PX that are arranged in the direction X. The pixels PX1a and PX1b are the pixels of a first color and comprise colored layers CF1 of the first color. The pixels PX2a and PX2b are the pixels of a second color different from the first color and comprise colored layers CF2 of the second color. The pixels PX3a and PX3b are the pixels of a third color different from the first color and the second color and comprise colored layers CF3 of the third color.

The main pixels MPXa and the main pixels MPXb are repeatedly arranged in the direction X. Rows of the main pixels MPXa arranged in the direction X and rows of main pixels MPXb arranged in the direction X are arranged alternately and repeatedly in the direction Y. Each pixel PX of the main pixels MPXa extends in a first extending direction d1, and each pixel PX of the main pixels MPXb extends in a second extending direction d2. Incidentally, the first extending direction d1 is a direction different from the directions X and Y. The second extending direction d2 is a direction different from the directions X and Y and the first extending direction d1. In the example shown in FIG. 5, the first extending direction d1 is a right downward direction, and the second extending direction d2 is a left downward direction.

When the shape of the pixel PX is substantially parallelogrammatic as shown in the figure, a plurality of domains different in direction of rotation of the director can be set in the unit pixel UPX. In other words, it is possible to form a number of domains with respect to the pixel of each color and compensate for the viewing angle characteristics by combining two main pixels MPXa and MPXb. For this reason, when the viewing angle characteristics are focused, one unit pixel UPX obtained by combining the main pixels MPXa and MPXb corresponds to the minimum unit for displaying a color image.

Figure 5:
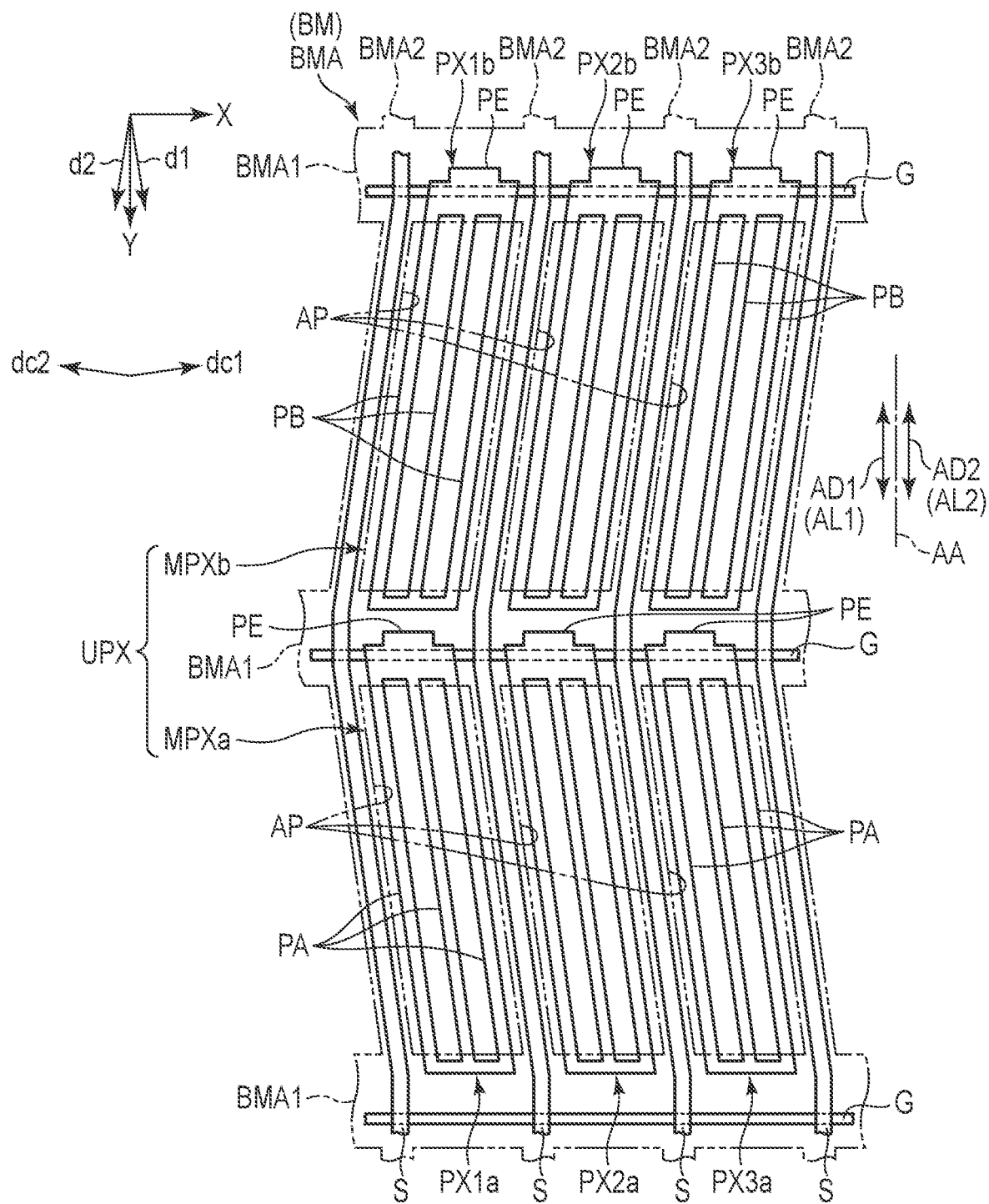
FIG. 5 is a plan view showing a unit pixel of the liquid crystal display panel, illustrating a scanning line, a signal line, a pixel electrode, and a light-shielding portion.

FIG. 5 is a plan view showing one unit pixel UPX of the liquid crystal display panel PNL, illustrating the scanning lines G, the signal lines S, the pixel electrodes PE, and light-shielding portion BMA. Incidentally, in FIG. 5, only constituent elements necessary for descriptions are illustrated, but illustration of the pixel switching element SWp, the common electrode CE, color filter CF, and the like is omitted.

As shown in FIG. 5, the plurality of pixels PX have a configuration conforming to a fringe field switching (FFS) mode, which is one of the display modes using the lateral electric field. The scanning lines G and the signal lines S are arranged on the first substrate SUB1 while the light-shielding portion BMA (light-shielding layer BM) is arranged on the second substrate SUB2. The scanning lines G and the signal lines S cross each other and extend in the display area (DA). Incidentally, the light-shielding portion BMA is a grating-shaped light-shielding portion located in the display area DA to partition the pixels PX, and is represented by a two-dot chain line in the figure.

The light-shielding portion BMA comprises at least a function of blocking light emitted from the above-described illumination device (IL). The light-shielding portion BMA is formed of a material having a high light absorption index such as black resin. The light-shielding portion BMA is formed in a grating shape. A plurality of light-shielding portions BMA1 extending in the direction X and a plurality of light-shielding portions BMA2 extending while bending in the first extending direction d1 and the second extending direction d2 are integrated to form the light-shielding portion BMA.

Each of the scanning lines G extends in the direction X. Each of the scanning lines G is opposed to the corresponding light-shielding portion BMA1 and extends along the corresponding light-shielding portion BMA1. The light-shielding portion BMA1 is opposed to the scanning line G, end parts of the pixel electrodes PE, and the like. Each of the signal lines S extends while bending in the direction Y, the first extending direction d1, and the second extending direction d2. Each of the signal lines S is opposed to the corresponding light-shielding portion BMA2 and extends along the corresponding light-shielding portion BMA2.

The light-shielding layer BM includes a plurality of apertures AP. The apertures AP are partitioned by the light-shielding portions BMA1 and BMA2. The apertures AP of the main pixel MPXa extend in the first extending direction d1. The apertures AP of the main pixel MPXb extend in the second extending direction d2.

Each of the pixel electrodes PE of the main pixel MPXa includes a plurality of linear pixel electrodes PA located in the apertures AP. The plurality of linear pixel electrodes PA extend linearly in the first extending direction d1, and are arranged and spaced apart in an orthogonal direction dc1 that is orthogonal to the first extending direction d1. The pixel electrodes PE of the main pixel MPXb include a plurality of linear pixel electrodes PB located in the apertures AP. The plurality of linear pixel electrodes PB extend linearly in the second extending direction d2, and are arranged and spaced apart in an orthogonal direction dc2 that is orthogonal to the second extending direction d2.

In the display area DA, the above-described alignment films AL1 and AL2 have an alignment axis AA parallel to the direction Y. An alignment direction AD1 of the alignment film AL1 is parallel to the direction Y, and an alignment direction AD2 of the alignment film AL2 is parallel to the alignment direction AD1.

When the voltage is applied to the liquid crystal layer (LC) as described above, the rotation state (orientation state) of the liquid crystal molecules in the apertures AP of the main pixel MPXa and the rotation state (orientation state) of the liquid crystal molecules in the apertures AP of the main pixel MPXb are different from each other. For this reason, it is possible to compensate for the viewing angle characteristics.

Figure 6:
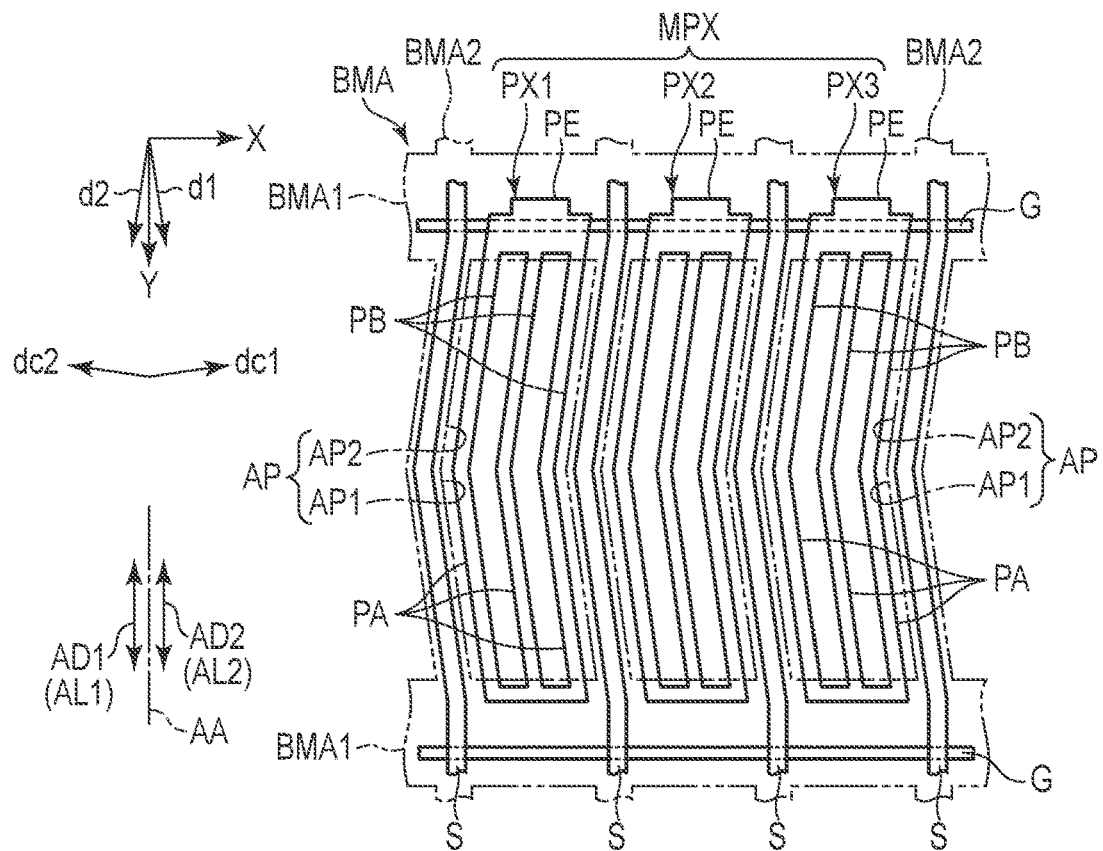
FIG. 6 is a plan view showing a main pixel different from the embodiment, illustrating a scanning line, a signal line, a pixel electrode, and a light-shielding portion.

As described above, the configuration of compensating for the viewing angle characteristics by one unit pixel UPX has been illustrated in FIG. 4 and FIG. 5. Unlike the present embodiment, however, the configuration may compensate for the viewing angle characteristics by one main pixel MPX. FIG. 6 is a plan view showing a main pixel MPX different from that of the present embodiment, illustrating the scanning lines G, the signal lines S, the pixel electrodes PE, and the light-shielding portion BMA.

As shown in FIG. 6, each of the apertures AP extends in the second extending direction d2, bends in the middle part, and extends in the first extending direction d1. Each of the apertures AP is shaped in a symbol < and includes a first aperture AP1 and a second aperture AP2. The first aperture AP1 extends in the first extending direction d1, and the second aperture AP2 extends in the second extending direction d2.

The pixel electrode PE extends in the second extending direction d2, bends in the middle part, and extends in the first extending direction d1. The pixel electrode PE comprises a plurality of linear pixel electrodes PA and a plurality of linear pixel electrodes PB. The plurality of linear pixel electrodes PA are located in the first apertures AP1, extend linearly in the first extending direction d1, and are arranged and spaced apart in the orthogonal direction dc1. The plurality of linear pixel electrodes PB are located in the second apertures AP2, extend linearly in the second extending direction d2, and are arranged and spaced apart in the orthogonal direction dc2. One linear pixel electrode PA and one linear pixel electrode PB that are formed sequentially are shaped in a symbol <.

In planar view in which the pixel PX1 is located on the left side and the pixel PX3 is located on the right side, one linear pixel electrode PA and one linear pixel electrode PB that are formed sequentially may be shaped in a symbol > and the aperture AP may be shaped in a symbol >.

When a voltage is applied to the liquid crystal layer (LC) as described above, a rotation state of the liquid crystal molecules in the first aperture AP1 and a rotation state of the liquid crystal molecules in the second apertures AP2 are different from each other. Each of the apertures AP has four domains different in rotational direction of the director. For this reason, the liquid crystal display panel PNL can obtain desirable viewing angle characteristics.

Incidentally, in the first embodiment, the pixel electrodes PE function as display electrodes, and the linear pixel electrodes PA and the linear pixel electrodes PB function as linear display electrodes.

Figure 7:
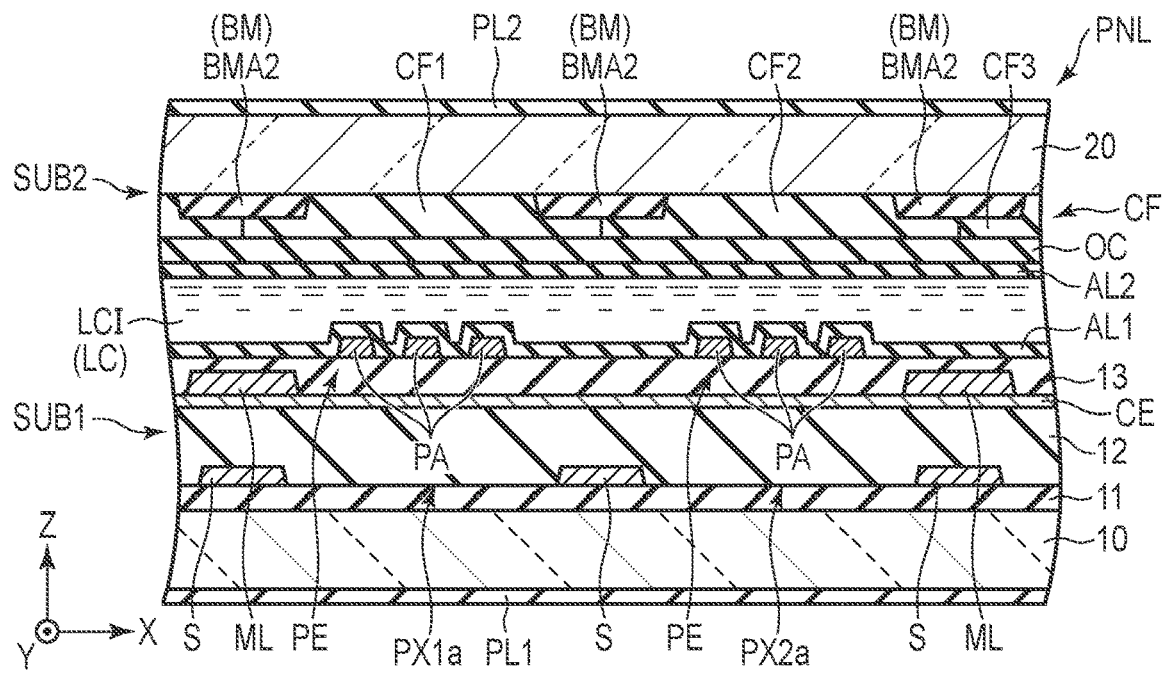
FIG. 7 is a cross-sectional view showing a liquid crystal display panel including the pixel shown in FIG. 5.

FIG. 7 is a cross-sectional view showing the liquid crystal display panel PNL including the pixels PX1 and PX2 shown in FIG. 5. The liquid crystal display panel PNL has a configuration corresponding to the Fringe Field Switching (FFS) mode, which is one of the display modes using a lateral electric field.

As shown in FIG. 7, the first substrate SUB1 comprises an insulating layer 11, the signal lines S, an insulating layer 12, the common electrode CE, a metal layer ML, an insulating layer 13, the pixel electrodes PE, and the like between the insulating substrate 10 and the alignment film AL1. In addition, a polarizer PL1 is formed outside the first substrate SUB1.

The insulating layer 11 is provided on the insulating substrate 10. The above-described scanning lines (G), gate electrodes and semiconductor layers of the pixel switching elements SWp, other insulating layers, and the like are arranged between the insulating substrate 10 and the insulating layer 11, though not described in detail. The signal lines S are formed on the insulating layer 11. The insulating layer 12 is provided on the insulating layer 11 and the signal lines S.

The common electrode CE is provided on the insulating layer 12. The metal layer ML is provided on the common electrode CE and is in contact with the common electrode CE. The metal layer ML is located just above the signal lines S. In the example illustrated, the first substrate SUB1 comprises the metal layer ML, but the metal layer ML may be omitted. The insulating layer 13 is provided on the common electrode CE and the metal layer ML.

The pixel electrodes PE are formed on the insulating layer 13. Each of the pixel electrodes PE is located between the adjacent signal lines S and is opposed to the common electrode CE. In addition, each of the pixel electrodes PE includes slits at a position opposed to the common electrode CE (aperture AP). The common electrode CE and the pixel electrode PE are formed of a transparent conductive material such as ITO or IZO. The insulating layer 13 is sandwiched between the pixel electrodes PE and the common electrode CE. The alignment film AL1 is provided on the insulating layer 13 and the pixel electrodes PE to cover the pixel electrodes PE and the like.

In contrast, the second substrate SUB2 comprises the light-shielding layer BM including light-shielding portions BMA2, the color filter CF including colored layers CF1, CF2, and CF3, the transparent layer OC, the alignment film AL2, and the like on the side of the insulating substrate 20 opposed to the first substrate SUB1. The light-shielding portions BMA2 are formed on the inner surface of the insulating substrate 20. The light-shielding portions BMA2 are located just above the signal lines S and the metal layer ML. The colored layers CF1 and CF2 are formed on the inner surface of the insulating substrate 20, and partially overlap the light-shielding portions BMA2. The transparent layer OC covers the color filter CF. The alignment film AL2 covers the transparent layer OC. In addition, the polarizer PL2 is formed on the outside of the second substrate SUB2.

Incidentally, the liquid crystal display panel PNL may be configured without the light-shielding portions BMA2 and the light-shielding portion BMA1 (FIG. 6) in the display area DA. In this case, the metal layer ML may be formed in a grating shape and, the metal layer ML may be made to comprise the light shielding function instead of the light-shielding portions BMA1 and BMA2, in the display area DA.

The liquid crystal layer LC includes a display liquid crystal layer LCI located in the display area DA. For example, the liquid crystal molecules contained in the display liquid crystal layer LCI are subjected to initial alignment in a transmission axis direction of the polarizer PL1 between the alignment films AL1 and AL2, in an off state in which the transmission axes of the polarizer PL1 and the polarizer PL2 are orthogonal, no voltage (electric field) is generated between the pixel electrode PE and the common electrode CE in the pixel PX1, and no voltage is applied to the display liquid crystal layer LCI. Therefore, no retardation occurs in the liquid crystal layer LC and, since the transmission axes of the polarizer PL1 and the polarizer PL2 are orthogonal to each other, pixel PX1 has the minimum transmittance and displays black. In other words, in the pixel PX1, the liquid crystal display panel PNL exerts the light shielding function.

In contrast, in the pixel PX1a, the liquid crystal molecules are aligned in a direction different from the initial alignment direction, and the alignment direction is controlled by the electric field, in an on state in which a voltage (electric field) generated between the pixel electrode PE and the common electrode CE is applied to the display liquid crystal layer LCI. Therefore, a retardation occurs in the liquid crystal layer LC, and in the pixel PX1, the liquid crystal display panel PNL exerts the light transmitting function. For this reason, the pixel PX1 in the on state exhibits a color corresponding to the colored layer CF1.

The mode of the liquid crystal display panel PNL is so-called a normally-black mode, which displays black in the off state, but may be so-called a normally-white mode, which displays black in the on state (and displays white in the off state).

The electrode closer to the display liquid crystal layer LCI (liquid crystal layer LC), of the pixel electrode PE and the common electrode CE, is the pixel electrode PE, and the pixel electrode PE functions as the display electrode as described above. However, the electrode closer to the display liquid crystal layer LCI (liquid crystal layer LC), of the pixel electrode PE and the common electrode CE, may be the common electrode CE. In such a case, the common electrode CE includes a slit located in the aperture AP, functions as a display electrode as described above, and includes a linear display electrode instead of the pixel electrode PE.

Figure 8:
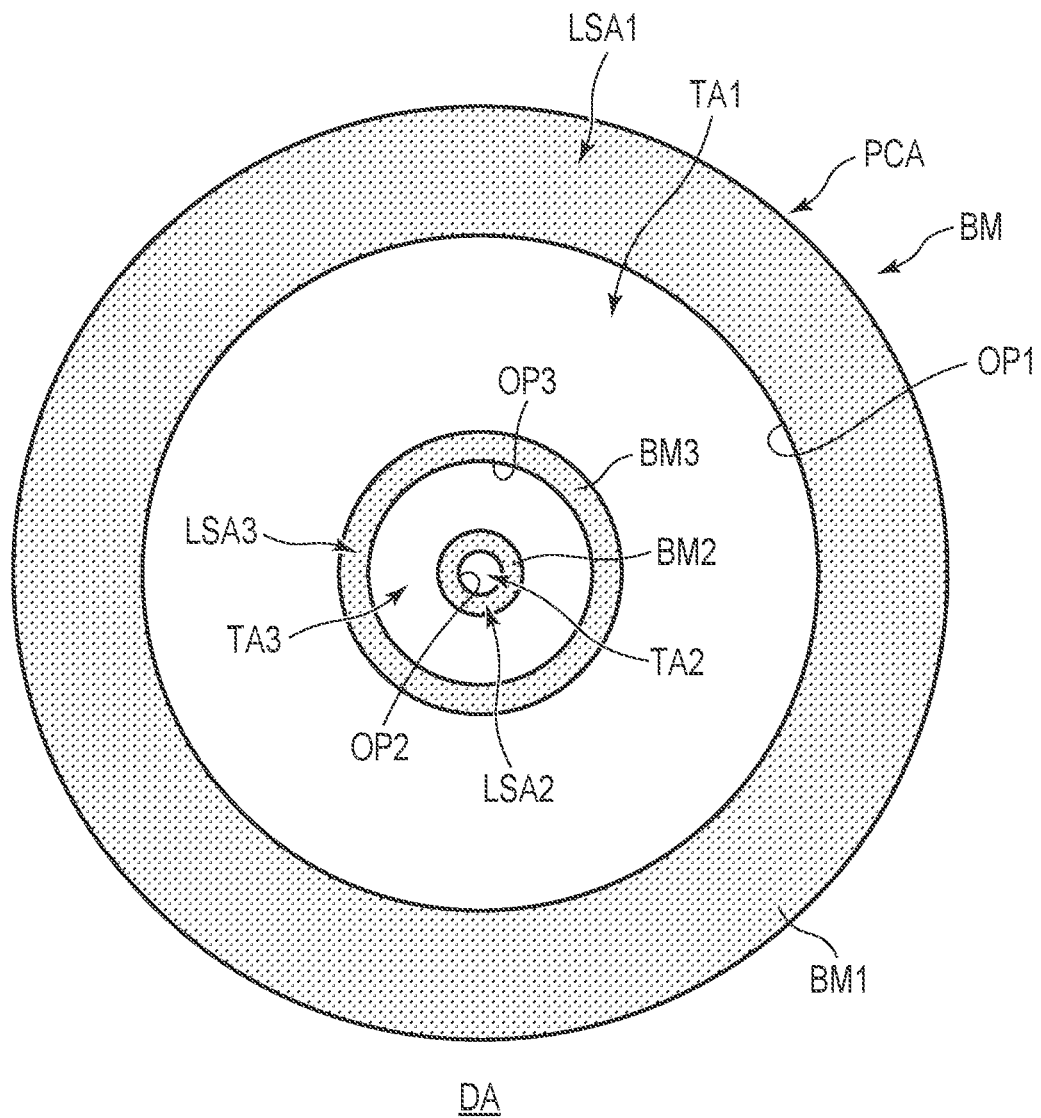
FIG. 8 is a plan view showing a light-shielding layer in an incident light control area of the liquid crystal display panel.

FIG. 8 is a plan view showing the light-shielding layer BM in the incident light control area PCA of the liquid crystal display panel PNL. In the figure, the light-shielding layer BM is marked with a dot pattern. As shown in FIG. 8, the incident light control area PCA includes a second incident light control area TA2 in the center, and includes the first light-shielding area LSA1, the first incident light control area TA1, a third light-shielding area LSA3, a third incident light control area TA3, a second light-shielding area LSA2, and the second incident light control area TA2, from the outside to the center.

The first light-shielding area LSA1 is located on the outermost periphery of the incident light control area PCA and has an annular shape. The first light-shielding area LSA1 has an outer periphery which is in contact with the display area DA. The first incident light control area TA1 is surrounded by the first light-shielding area LSA1, has an outer periphery which is in contact with the first light-shielding area LSA1, and has an annular shape. The second incident light control area TA2 is located in the center of the incident light control area PCA, has an outer periphery which is in contact with the second light-shielding area LSA2, and has a circular shape.

The second light-shielding area LSA2 has an inner periphery which is in contact with the second incident light control area TA2, surrounds the second incident light control area TA2, and has an annular shape. The third light-shielding area LSA3 is surrounded by the first incident light control area TA1, has an outer periphery which is in contact with the first incident light control area TA1, and has an annular shape. The third incident light control area TA3 is surrounded by the third light-shielding area LSA3, has an outer periphery which is in contact with the third light-shielding area LSA3 and an inner periphery which is in contact with the second light-shielding area LSA2, and has an annular shape.

The first light-shielding area LSA1, the second light-shielding area LSA2, and the third light-shielding area LSA3 may be referred to as annular light-shielding areas. The first incident light control area TA1 and the third incident light control area TA3 may be referred to as annular incident light control areas. The second incident light control area TA2 may be referred to as a circular incident light control area. The first incident light control area TA1, the second incident light control area TA2, and the third incident light control area TA3 are the areas where the quantity of the transmitted light can be adjusted.

In the incident light control area PCA, the light-shielding layer BM includes the first light-shielding portion BM1, the first opening OP1, a second light-shielding portion BM2, a second opening OP2, a third light-shielding portion BM3, and a third opening OP3. The first light-shielding portion BM1 is located in the first light-shielding area LSA1 and has an annular shape. The second light-shielding portion BM2 is located in the second light-shielding area LSA2 and has an annular shape. The third light-shielding portion BM3 is located in the third light-shielding area LSA3 and has an annular shape.

The light-shielding portion of each of the first light-shielding portion BM1, the second light-shielding portion BM2, and the third light-shielding portion BM3 may be referred to as an annular light-shielding portion. The first opening OP1 and the third opening OP3 have an annular shape, and the second opening OP2 has a circular shape.

Incidentally, the first light-shielding portion BM1, the second light-shielding portion BM2, and the third light-shielding portion BM3 can be formed of the same material, in the same layer, by the same processes as the light-shielding layer BM formed in the display area DA.

An outer peripheral circle of the first light-shielding portion BM1, an outer peripheral circle of the first incident light control area TA1, an outer peripheral circle of the second light-shielding portion BM2, the second incident light control area TA2, an outer peripheral circle of the third light-shielding portion BM3, and an outer peripheral circle of the third incident light control area TA3 are concentric circles.

The liquid crystal display panel PNL may be configured without the third light-shielding area LSA3, the third light-shielding portion BM3, and the third incident light control area TA3. In this case, an inner periphery of the first incident light control area TA1 may be in contact with the second light-shielding area LSA2.

Figure 9:
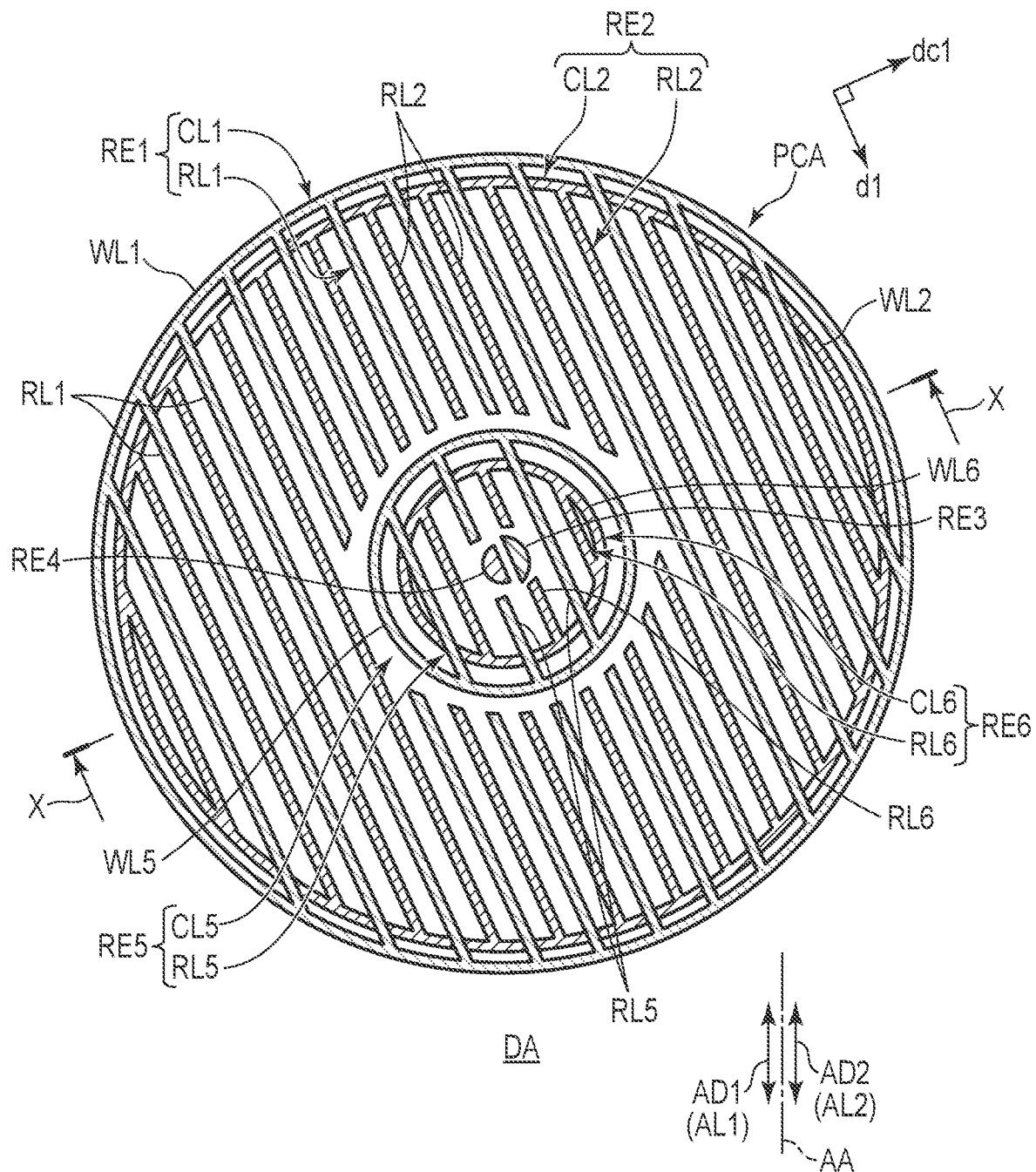
FIG. 9 is a plan view showing a plurality of control electrodes of the liquid crystal display panel.

FIG. 9 is a plan view showing an electrode structure of the incident light control area PCA of the liquid crystal panel PNL, illustrating a plurality of control electrode structures RE. As shown in FIG. 9 and FIG. 8, the liquid crystal display panel PNL comprises a first control electrode structure RE1, a second control electrode structure RE2, the third control electrode structure RE3, the fourth control electrode structure RE4, a fifth control electrode structure RE5, and a sixth control electrode structure RE6.

Incidentally, FIG. 9 is a schematic view showing that the electrode has a configuration conforming to the In-Plane-Switching (IPS) mode in the incident light control area PCA.

The first control electrode structure RE1 comprises a first power supply line CL1 and first control electrodes RL1.

The first power supply line CL1 is located in the first light-shielding area LSA1 and includes a first line WL1. In the present embodiment, the first line WL1 has an annular shape.

A plurality of first control electrodes RL1 are located in the first light-shielding area LSA1 and the first incident light control area TA1, are electrically connected to the first line WL1, extend linearly in the first extending direction d1, and are arranged and spaced apart in the orthogonal direction dc1. The first control electrodes RL1 are arranged inside the first line WL1.

The plurality of first control electrodes RL1 include the first control electrodes RL1 having both ends connected to the first line WL1, and the first control electrodes RL1 having one end connected to the first line WL1 and the other end not connected to the first line WL1.

The second control electrode structure RE2 comprises a second power supply line CL2 and the second control electrodes RL2. The second power supply line CL2 includes a second line WL2. The second control electrode structure RE2 has the same structure as the first control electrode structure RE1. The second line WL2 is located on an inner side than the first line WL1, but may be located on an outer side than the first line WL1.

The plurality of first control electrodes RL1 and the plurality of second control electrodes RL2 are arranged alternately in the orthogonal direction dc1.

The third control electrode structure RE3 and the fourth control electrode structure RE4 are located in the second light-shielding area LSA2 and the second incident light control area TA2. The third control electrode structure RE3 and the fourth control electrode structure RE4 are shown as semicircular shapes having sides parallel to the first extending direction d1. The side of the third control electrode structure RE3 and the side of the fourth control electrode structure RE4 are located and spaced apart in the orthogonal direction dc1. Incidentally, the shapes of the third control electrode structure RE3 and the fourth control electrode structure RE4 can be variously modified.

The fifth control electrode structure RE5 comprises a fifth power supply line CL5 and fifth control electrodes RL5. The fifth power supply line CL5 includes a fifth line WL5. The fifth power supply line CL5 is located in the third light-shielding area LSA3 and has an annular shape.

A plurality of fifth control electrodes RL5 are located in the third light-shielding area LSA3 and the third incident light control area TA3, are electrically connected to the fifth line WL5, extend linearly in the first extending direction d1, and are arranged and spaced apart in the orthogonal direction dc1. The fifth line WL5 and the fifth control electrodes RL5 are formed integrally. The fifth control electrode RL5 is arranged inside the fifth line WL5.

A plurality of fifth control electrodes RL5 include the fifth control electrodes RL5 having both ends connected to the fifth line WL5, and the fifth control electrodes RL5 having one end connected to the fifth line WL5 and the other end not connected to the fifth line WL5.

The sixth control electrode structure RE6 comprises a sixth power supply line CL6 and sixth control electrodes RL6. The sixth power supply line CL6 includes a sixth line WL6. The sixth control electrode structure RE6 has the same structure as the fifth control electrode structure RE5. The sixth line WL6 is located on an inner side than the fifth line WL5, but may be located on an outer side than the fifth line WL5.

The plurality of fifth control electrodes RL5 and the plurality of sixth control electrodes RL6 are arranged alternately in the orthogonal direction dc1.

Incidentally, the first power supply line CL1, the second power supply line CL2, the fifth power supply line CL5, and the sixth power supply line CL6 may be formed of a stacked layer body of transparent conductive layers and metal layers.

As described with reference to FIG. 7, the pixel electrodes PE and the common electrode CE in the display area DA are formed of a transparent conductive material (transparent conductive film), and the pixel PX includes transparent conductive films of two different layers. The first line WL1 to the sixth line WL6 can be formed of one of the two layers of the transparent conductive films, and the first control electrode RL1 to the sixth control electrode RL6 can be formed of the other transparent conductive film, to enable the first control electrode RL1 to the sixth control electrode RL6 to be formed in the same layer. Incidentally, the first line WL1 to the sixth line WL6 can also be formed of multi-layered films of the transparent conductive films and metal films.

The liquid crystal display panel PNL has a configuration conforming to the IPS mode, which is one of the display modes using the lateral electric field in the incident light control area PCA. Each of the above-described first control electrode RL1 to sixth control electrode RL6 has a shape different from the above-described shape of the pixel electrode PE conforming to the FFS mode.

As represented by the first control electrode RL1 and the second control electrode RL2, voltages are supplied to the alternately arranged control electrodes, and the liquid crystal molecules are driven by the potential difference generated between the electrodes.

In the incident light control area PCA, the above-described alignment films AL1 and AL2 have an alignment axis AA parallel to the direction Y. In other words, the alignment axis AA of the alignment films AL1 and AL2 is parallel in the display area DA and the incident light control area PCA. In the incident light control area PCA, the alignment direction AD1 of the alignment film AL1 is parallel to the direction Y, and the alignment direction AD2 of the alignment film AL2 is parallel to the alignment direction AD1.

In a state in which a voltage is not applied to the liquid crystal layer LC, the initial alignment direction of the liquid crystal molecules of the display area DA is the same as the initial alignment direction of the liquid crystal molecules of the incident light control area PCA. The above-described linear pixel electrodes (linear display electrodes) PA and the control electrodes RL extend in parallel. On the X-Y plane of the first embodiment, each of the first extending direction d1 and the second extending direction d2 is inclined to the direction Y at 10 degrees. For this reason, the direction of rotation of the liquid crystal molecules can be made the same in the display area DA and the incident light control area PCA. Tilting on the linear pixel electrodes PA has been described. However, the above-described matters are the same in a case of replacing tilting on the linear pixel electrodes PA with tilting the slit of the common electrode.

Figure 10:
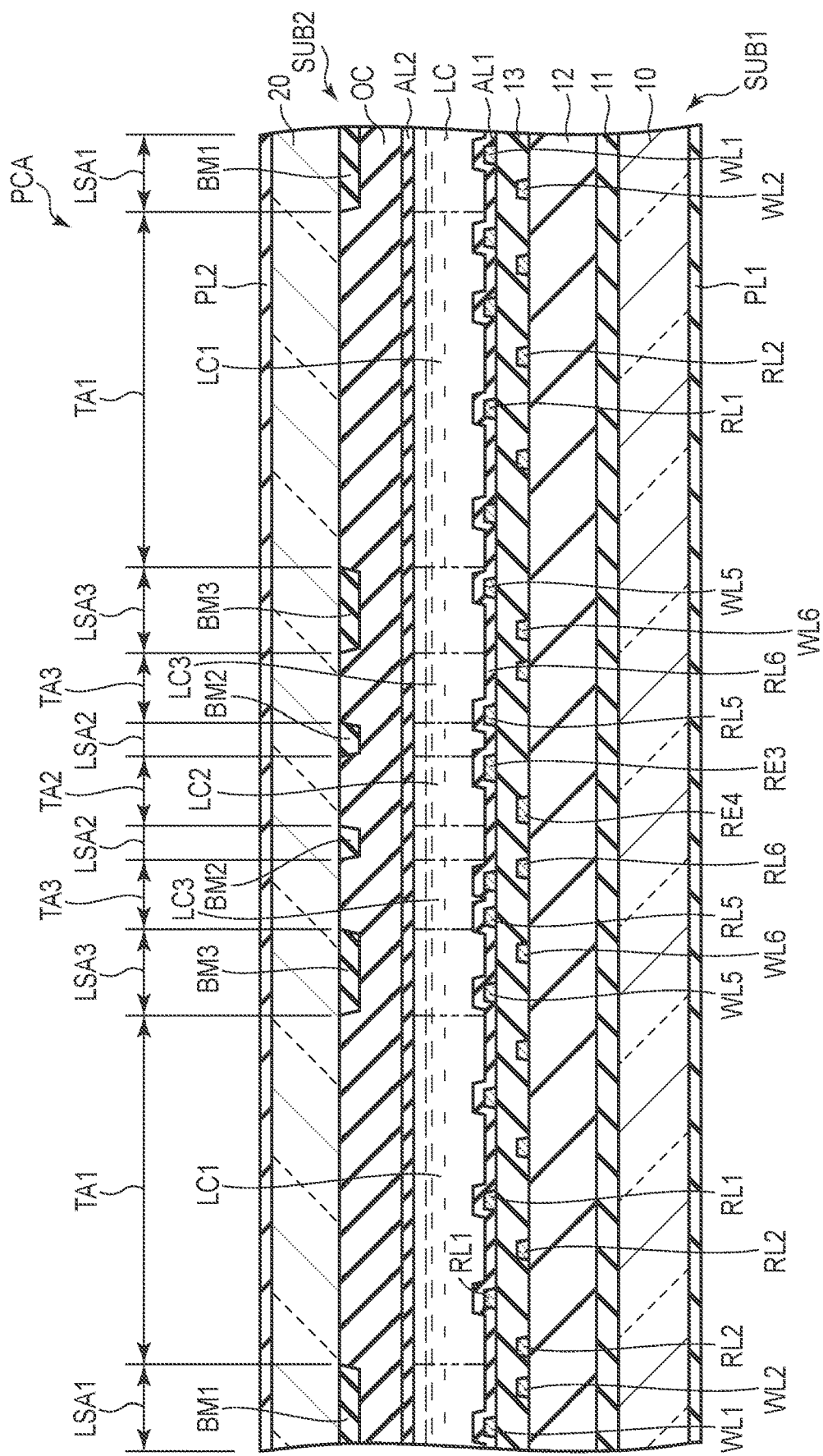
FIG. 10 is a cross-sectional view showing the incident light control area of the liquid crystal display panel.

FIG. 10 is a cross-sectional view showing the incident light control area PCA of the liquid crystal display panel PNL. In FIG. 10, illustration of the signal lines S, the scanning lines G, and the like is omitted.

As shown in FIG. 10, one of two conductors formed to sandwich the insulating layer 13 is formed in the same layer as one of the pixel electrode PE and the common electrode CE, and is formed of the same material as the one of the electrodes. The other of the two conductors is provided in the same layer as the other of the pixel electrode PE and the common electrode CE, and is formed of the same material as the other of the electrodes.

In FIG. 10, the second line WL2, the second control electrode RL2, the fourth control electrode structure RE4, the sixth line WL6, and the sixth control electrode RL6 are provided on the insulating layer 12 and covered with the insulating layer 13. The second line WL2, the second control electrode RL2, the fourth control electrode structure RE4, the sixth line WL6, and the sixth control electrode RL6 are provided in the same layer as the common electrode CE and formed of the same transparent conductive material as the common electrode CE.

The first line WL1, the first control electrode RL1, the third control electrode structure RE3, the fifth line WL5, and the fifth control electrode RL5 are provided on the insulating layer 13 and covered with the alignment film AL1. The first control electrode RL1, the third control electrode structure RE3, the fifth line WL5, and the fifth control electrode RL5 are provided in the same layer as the pixel electrode PE and formed of the same transparent conductive material as the pixel electrode PE.

For example, the insulating layer 13 is sandwiched between the first control electrode RL1 (first control electrode structure RE1) and the second control electrode RL2 (second control electrode structure RE2). Incidentally, the first control electrode RL1, the second control electrode RL2, the third control electrode structure RE3, the fourth control electrode structure RE4, the fifth control electrode RL5, and the sixth control electrode RL6 may be formed in the same layer.

In the incident light control area PCA, the alignment film AL1 covers the first line WL1, the first control electrode RL1, the second line WL2, the second control electrode RL2, the third control electrode structure RE3, fourth control electrode structure RE4, the fifth line WL5, the fifth control electrode RL5, the sixth line WL6, and the sixth control electrode RL6 and is in contact with the liquid crystal layer LC.

In the second substrate SUB2, the color filter CF is not provided in the incident light control area PCA.

The liquid crystal layer LC includes a first control liquid crystal layer LC1 located in the first incident light control area TA1, a second control liquid crystal layer LC2 located in the second incident light control area TA2, and a third control liquid crystal layer LC3 located in the third incident light control area TA3.

A voltage generated by the first control electrode RL1 and the second control electrode RL2 is applied to the first control liquid crystal layer LC1. A voltage generated by the third control electrode structure RE3 and the fourth control electrode structure RE4 is applied to the second control liquid crystal layer LC2. A voltage generated by the fifth control electrode RL5 and the sixth control electrode RL6 is applied to the third control liquid crystal layer LC3.

Driving the first control electrode structure RE1 and the second control electrode structure RE2 to apply the voltage to the first control liquid crystal layer LC1, of the plurality of control electrodes RL, will be focused. A first control voltage is applied to the first control electrode structure RE1, and a second control voltage is applied to the second control electrode structure RE2.

One of the first control voltage and the second control voltage may be fixed to the reference voltage, similarly to the common electrode, and the other of the first control voltage and the second control voltage may be switched to the reference voltage, a first output voltage that is more positive than the reference voltage, or a second output voltage that is more negative than the reference voltage.

Alternatively, one of the first control voltage and the second control voltage may be a first output voltage, and the other of the first control voltage and the second control voltage may be a second output voltage, during any period.

Setting the first control voltage and the second control voltage as described above can contribute to, for example, polarity inversion drive. Incidentally, driving the first control electrode structure RE1 and the second control electrode structure RE2 can also be applied to driving the third control electrode structure RE3 and the fourth control electrode structure RE4, and driving the fifth control electrode structure RE5 and the sixth control electrode structure RE6.

Next, the first control electrode structure RE1 and the second control electrode structure RE2 representing the first control electrode structure RE1 to the sixth control electrode structure RE6 will be described. The elements described herein can be applied to a set of the third control electrode structure RE3 and the fourth control electrode structure RE4, and a set of the fifth control electrode structure RE5 and the sixth control electrode structure RE6.

Figure 11:
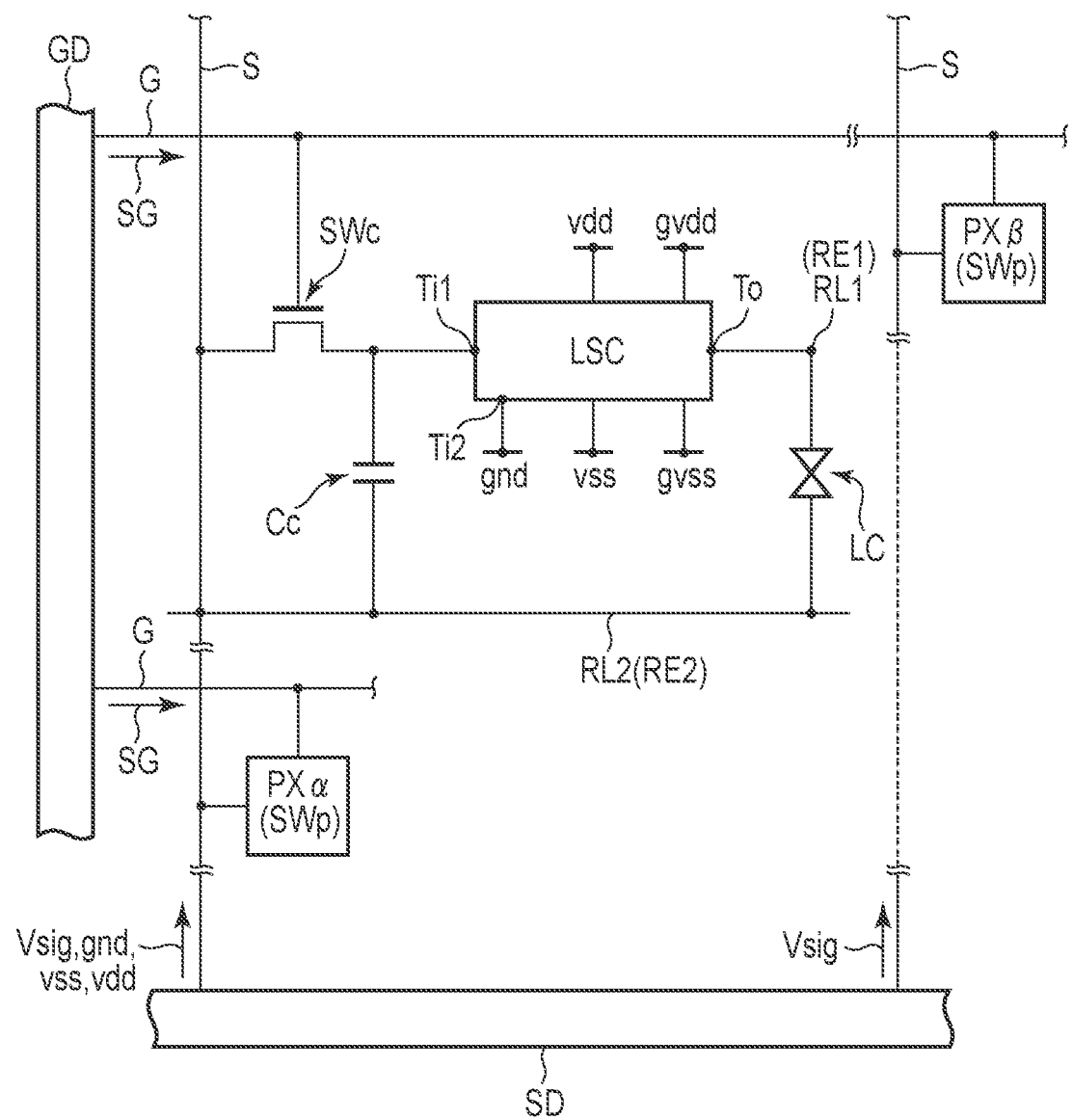
FIG. 11 is a diagram showing an equivalent circuit of the control switching element, capacitor, level shift circuit, first control electrode structure, liquid crystal layer, second control electrode structure, scanning line, and signal line of the liquid crystal display panel, together with a plurality of pixels, the scanning line driving circuit, and the signal line driving circuit.

First, the first control electrode structure RE1, the second control electrode structure RE2, and peripheral circuits thereof will be described. FIG. 11 is a diagram showing an equivalent circuit of the control switching element SWc, a capacitor Cc, a level shift circuit LSC, the first control electrode structure RE1, the liquid crystal layer LC, the second control electrode structure RE2, the scanning lines G, and the signal lines S of the liquid crystal display panel PNL, together with the plurality of pixels PX, a scanning line driving circuit GD, and a signal line driving circuit SD.

As shown in FIG. 11, the liquid crystal display panel PNL comprises the scanning line driving circuit GD and the signal line driving circuit SD. The scanning line driving circuit GD is connected to the plurality of scanning lines G. The signal line driving circuit SD is connected to the plurality of signal lines S. Incidentally, parts of the scanning line driving circuit GD and the signal line driving circuit SD may be provided outside the liquid crystal display panel PNL.

The liquid crystal display panel PNL further comprises the control switching element SWc, the capacitor Cc, and the level shift circuit LSC. The control switching element SWc is formed by, for example, an N-channel transistor (TFT). In the present embodiment, the pixel switching element SWp is configured similarly to the control switching element SWc. The control switching element SWc is electrically connected to a corresponding scanning line G of the plurality of scanning lines G, and a corresponding signal line S of the plurality of signal lines S.

The level shift circuit LSC is connected between the control switching element SWc and the first control electrode structure RE1 (first control electrodes RL1). The level shift circuit LSC includes a first input terminal Ti1, a second input terminal Ti2, and an output terminal To. The first input terminal Ti1 is electrically connected to the control switching element SWc. The second input terminal Ti2 is electrically connected to, for example, a ground (gnd). The output terminal To is electrically connected to the first control electrode structure RE1 (first control electrodes RL1).

Incidentally, the plurality of pixels PX are connected to the scanning line G and the signal line S connected to the control switching element SWc. For example, the signal line S connected to the control switching element SWc is the same as the signal line S connected to the pixel switching element SWp of one pixel PXα of the plurality of pixels PX. In addition, the scanning line G connected to the control switching element SWc is the same as the scanning line G connected to the pixel switching element SWp of one pixel PXβ of the plurality of pixels PX.

The control switching element SWc is switched to an on (conductive) state or an off (non-conductive) state by the control signal SG supplied from the scanning line driving circuit GD via the scanning line G. The control signal SG is also supplied to the pixel switching elements SWp of the pixels PX. The voltage level of the control signal SG falls within a range of, for example, −8V to +8V. In the present embodiment, the voltage level of the control signal SG is switched between two values, i.e., −8V and +8V. When a gate-high voltage is referred to as VGH and a gate-low voltage is referred to as VGL, VGH is +8V and VGL is −8V.

The signal line driving circuit SD outputs the image signal Vsig to each of the signal lines S. For this reason, the pixel switching elements SWp of the pixels PX switch outputting or not outputting the image signal Vsig to the pixel electrode PE. The voltage level of the image signal Vsig falls within, for example, a range between a first power supply voltage vdd and a second power supply voltage vss. In the present embodiment, the first power supply voltage vdd is +5V and the second power supply voltage vss is −5V.

The signal line driving circuit SD outputs the first power supply voltage vdd, the second power supply voltage vss, and the reference voltage gnd, separately from the image signal Vsig, to the signal line S connected to the control switching element SWc. For this reason, the control switching element SWc switches outputting or not outputting the first power supply voltage vdd, the second power supply voltage vss, and the reference voltage gnd that are input from the signal line S, to the level shift circuit LSC. In the present embodiment, the level of the reference voltage gnd is the ground level, for example, 0V. The level shift circuit LSC selectively applies a first output voltage gvdd, a second output voltage gvss, and the reference voltage gnd to the first control electrode structure RE1 (first control electrodes RL1).

The positions of the level shift circuit LSC and the control switching element SWc in the incident light control area PCA will be described.

As shown in FIG. 8, FIG. 9, and FIG. 11, the level shift circuit LSC and the control switching element SWc are located in the light-shielding area LSA. In the present embodiment, the level shift circuit LSC and the control switching element SWc are located in the first light-shielding area LSA1. Incidentally, the level shift circuit LSC and the control switching element SWc electrically connected to each of the control electrode structures RE other than the first control electrode structure RE1 are also desirably located in the light-shielding area LSA such as the first light-shielding area LSA1. Since the level shift circuit LSC and the control switching element SWc are not located in the incident light control area TA, reduction in area of the incident light control area TA can be prevented.

Next, the configuration of the level shift circuit LSC will be described. FIG. 12 is a circuit diagram showing the level shift circuit LSC.

As shown in FIG. 12, the level shift circuit LSC comprises a first level shift unit LS1, a first inverter IV1, a first switching element SW1, a second level shift unit LS2, a second inverter IV2, a second switching element SW2, a third switching element SW3, and a fourth switching element SW4. In the present embodiment, each of the first switching element SW1 to the fourth switching element SW4 is formed of TFT.

The first level shift unit LS1 is electrically connected to a first power supply voltage line, a first output voltage line, and a reference voltage line. To the first level shift unit LS1, the first power supply voltage vdd more positive than the reference voltage gnd is input via the first power supply voltage line, the first output voltage gvdd more positive than the reference voltage gnd is input via the first output voltage line, and the reference voltage gnd is input via the reference voltage line.

The first level shift unit LS1 outputs the first output voltage gvdd when the first power supply voltage vdd is input from the first input terminal Ti1. An absolute value of the first output voltage gvdd is larger than an absolute value of the first power supply voltage vdd. In the present embodiment, the first output voltage gvdd is +10V. The first level shift unit LS1 outputs the reference voltage gnd when the reference voltage gnd or the second power supply voltage vss more negative than the reference voltage gnd is input from the first input terminal Ti1.

At the first inverter IV1, one of power terminals is electrically connected to the first output voltage line, and the other power terminal is electrically connected to the reference voltage line. To the first inverter IV1, the first output voltage gvdd is input via the first output voltage line, and the reference voltage gnd is input via the reference voltage line.

The first inverter IV1 outputs the reference voltage gnd when the first output voltage gvdd is input from the first level shift unit LS1. The first inverter IV1 outputs the first output voltage gvdd when the reference voltage gnd is input from the first level shift unit LS1.

The first switching element SW1 is a P-channel transistor and includes a first gate electrode to which the first output voltage gvdd or the reference voltage gnd is input from the first inverter IV1. The first switching element SW1 is connected between the first output voltage line and the output terminal To.

The first switching element SW1 permits the first output voltage gvdd to be output to the output terminal To when the reference voltage gnd is input from the first inverter IV1. The first switching element SW1 prohibits the first output voltage gvdd to be output to the output terminal To when the first output voltage gvdd is input from the first inverter IV1.

The second level shift unit LS2 is electrically connected to the reference voltage line, a second power supply voltage line, and a second output voltage line. To the second level shift unit LS2, the reference voltage gnd is input via the reference voltage line, the second power supply voltage vss is input via the second power supply voltage line, and the second output voltage gvss more negative than the reference voltage gnd is input via the second output voltage line.

The second level shift unit LS2 outputs the reference voltage gnd when the reference voltage gnd or the first power supply voltage vdd is input from the first input terminal Ti1. The second level shift unit LS2 outputs the second output voltage gvss when the second power supply voltage vss is input from the first input terminal Ti1. An absolute value of the second output voltage gvss is larger than an absolute value of the second power supply voltage vss. In the present embodiment, the second output voltage gvss is −10V.

At the second inverter IV2, one of power terminals is electrically connected to the reference voltage line, and the other power terminal is electrically connected to the second output voltage line. To the second inverter IV2, the reference voltage gnd is input via the reference voltage line, and the second output voltage gvss is input via the second output voltage line.

The second inverter IV2 outputs the second output voltage gvss when the reference voltage gnd is input from the second level shift unit LS2. The second inverter IV2 outputs the reference voltage gnd when the second output voltage gvss is input from the second level shift unit LS2.

The second switching element SW2 is an N-channel transistor and includes a second gate electrode to which the second output voltage gvss or the reference voltage gnd is input from the second inverter IV2. The second switching element SW2 is connected between the second output voltage line and the output terminal To.

The second switching element SW2 permits the second output voltage gvss to be output to the output terminal To when the reference voltage gnd is input from the second inverter IV2. The second switching element SW2 prohibits the second output voltage gvss to be output to the output terminal To when the second output voltage gvss is input from the second inverter IV2.

The third switching element SW3 is an N-channel transistor and includes a third gate electrode to which the first output voltage gvdd or the reference voltage gnd is input from the first inverter IV1. The third switching element SW3 is connected between the second input terminal Ti2 and the output terminal To.

The second input terminal Ti2 is electrically connected to the reference voltage line. The reference voltage gnd is input to the second input terminal Ti2 via the reference voltage line.

The third switching element SW3 permits the reference voltage gnd to be output from the second input terminal Ti2 to the output terminal To when the first output voltage gvdd is input from the first inverter IV1. The third switching element SW3 prohibits the reference voltage gnd to be output from the second input terminal Ti2 to the output terminal To when the reference voltage gnd is input from the first inverter IV1.

The fourth switching element SW4 is a P-channel transistor and includes a fourth gate electrode to which the second output voltage gvss or the reference voltage gnd is input from the second inverter IV2. The fourth switching element SW4 is connected serially with the third switching element SW3, at a position between the second input terminal Ti2 and the output terminal To.

The fourth switching element SW4 permits the reference voltage gnd to be output from the second input terminal Ti2 to the output terminal To when the second output voltage gvss is input from the second inverter IV2. The fourth switching element SW4 prohibits the reference voltage gnd to be output from the second input terminal Ti2 to the output terminal To when the reference voltage gnd is input from the second inverter IV2.

Next, circuit configurations of the first level shift unit LS1 and the second level shift unit LS2 in the level shift circuit LSC will be described. FIG. 13 is a circuit diagram showing the first level shift unit LS1 shown in FIG. 12. FIG. 14 is a circuit diagram showing the second level shift unit LS2 shown in FIG. 12.

As shown in FIG. 13, the first level shift unit LS1 includes a front stage part P1*a*, a rear stage part P1*b*, and a main part P1*c*.

An input terminal (IN) of the front stage part P1*a* is electrically connected to the first input terminal Ti1 and is composed of a single inverter IT. An output terminal (OUT) of the rear stage part P1*b* is electrically connected to the first inverter IV1 and is composed of three inverters IT connected serially. The number of stages of the inverters IT in each of the front stage part P1*a* and the rear stage part P1*b* can be variously modified.

The number of inverter stages in the front stage part P1*a* is not limited to one, but can be an odd number of stages other than one. In this case, the number of inverter stages in the rear stage part P1*b* is not limited to three, but can be any odd number of stages other than three.

The first level shift unit LS1 may be configured without the front stage part P1*a* (the number of inverter stages in the front stage part P1*a* is 0). Alternatively, the number of inverter stages in the front stage part P1*a* may be an even number. In this case, the number of inverter stages in the rear stage part P1*b* may be an even number.

The main part P1*c* is electrically connected between the front stage part P1*a* and the rear stage part P1*b*. The main part P1*c* includes one inverter IT, a plurality of N-channel TFTs trn, and a plurality of P-channel TFTs trp.

As shown in FIG. 14, the second level shift unit LS2 includes a front stage part P2*a*, a rear stage part P2*b*, and a main part P2*c*.

An input terminal (IN) of the front stage part P2*a* is electrically connected to the first input terminal Ti1 and is composed of a single inverter IT. An output terminal (OUT) of the rear stage part P2*b* is electrically connected to the second inverter IV2 and is composed of three inverters IT connected serially. The number of stages of the inverters IT in each of the front stage part P2*a* and the rear stage part P2*b* can be variously modified.

The number of inverter stages in the front stage part P2*a* is not limited to one, but can be an odd number of stages other than one. In this case, the number of inverter stages in the rear part P2*b* is not limited to three, but can be any odd number of stages other than three.

The second level shift unit LS2 may be configured without the front stage part P2*a* (the number of inverter stages in the front stage part P2*a* is 0). Alternatively, the number of inverter stages in the front stage part P2*a* may be an even number. In this case, the number of inverter stages in the rear stage part P2*b* may be an even number.

The main part P2*c* is electrically connected between the front stage part P2*a* and the rear stage part P2*b*. The main part P2*c* includes one inverter IT, a plurality of N-channel TFTs trn, and a plurality of P-channel TFTs trp.

According to the electronic device 100 of the embodiment configured as described above, the electronic device 100 comprises a liquid crystal display device DSP, a camera 1a, and the like. The liquid crystal display device DSP comprises a liquid crystal display panel PNL. The liquid crystal display panel PNL includes the incident light control area PCA opposed to the camera 1a. For this reason, the liquid crystal display panel PNL enables visible light from the outside to be selectively transmitted to the camera 1a.

The liquid crystal display panel PNL further includes the level shift circuit LSC. The level shift circuit LSC is electrically connected to the control electrode RL (the control electrode structure RE), and can selectively apply the first output voltage gvdd, the second output voltage gvss, and the reference voltage gnd to the control electrode RL (the control electrode structure RE).

As a result, the level shift circuit LSC capable of three-value output, the liquid crystal display panel PNL comprising the level shift circuit LSC, and the electronic device 100 comprising the liquid crystal display panel PNL can be obtained.

The signal line driving circuit SD outputs the image signal Vsig to each of the signal lines S. The voltage level applied to the signal line S by the signal line driving circuit SD falls within a range of −5V to +5V. For this reason, the pixel electrode PE is driven by the image signal Vsig of −5V to +5V.

In contrast, the control electrode RL (control electrode structure RE) is electrically connected to the signal line S via the level shift circuit LSC. The voltage level applied to the control electrode RL (the control electrode structure RE) by the level shift circuit LSC is −10V, ground level (essentially 0V), and +10V. The control electrode RL (the control electrode structure RE) is driven at a voltage level higher than the voltage level that drives the pixel electrode PE.

For this reason, insufficient writing to the control electrode RL (the control electrode structure RE) can be suppressed. For example, in a case where the mode in the incident light control area PCA of the liquid crystal display panel PNL is the normally-black mode, a problem that a sufficient quantity of transmitted light cannot be obtained when the incident light control area PCA of the liquid crystal display panel PNL is switched to a transmitted state (white display state) can be solved.

In a case where the mode in the incident light control area PCA of the liquid crystal display panel PNL is the normally-white mode, a problem that a pinhole-shot image or an IR-shot image becomes unclear can be solved. The pinhole shooting is the shooting performed by switching the only second incident light control area TA2 of the incident light control area PCA to the transmitted state. The IR shooting is the shooting performed by switching the entire incident light control area PCA to the light-shielding state (a state that blocks visible light).

Next, several modified examples of the circuit configurations of the first level shift unit LS1 and the second level shift unit LS2 in the level shift circuit LSC will be described. The circuit configurations of the first level shift unit LS1 and the second level shift unit LS2 are not limited to the examples shown in FIG. 13 and FIG. 14, but can be variously modified.

Modified Example 1

Next, modified example 1 of the above embodiment will be described. FIG. 15 is a circuit diagram showing a part of the level shift circuit LSC according to modified example 1, illustrating the first level shift unit LS1. The electronic device 100 is configured in the same manner as the above-described embodiment except for constituent elements to be described in modified example 1.

As shown in FIG. 15, the first level shift unit LS1 may be configured. An input terminal (IN) of the first level shift unit LS1 is electrically connected to the first input terminal Ti1. Signals are supplied to the other input terminal (/IN) of the first level shift unit LS1 via lines or the like. For example, the signal line S electrically connected to the input terminal (IN) and the signal line S electrically connected to the input terminal (/IN) are different from each other. The signals input to the input terminal (/IN) correspond to the signals obtained by inverting the signals input to the input terminal (IN).

The first output voltage gvdd and the reference voltage gnd are further supplied to the first level shift unit LS1. The output terminals (OUT and /OUT) of the first level shift unit LS1 are electrically connected to the first inverter IV1.

Although not shown in the figure, the second level shift unit LS2 is configured in the same manner as the first level shift unit LS1 shown in FIG. 15.

The same advantages as those of the above-described embodiment can also be obtained from modified example 1 configured as described above.

Modified Example 2

Figure 16:
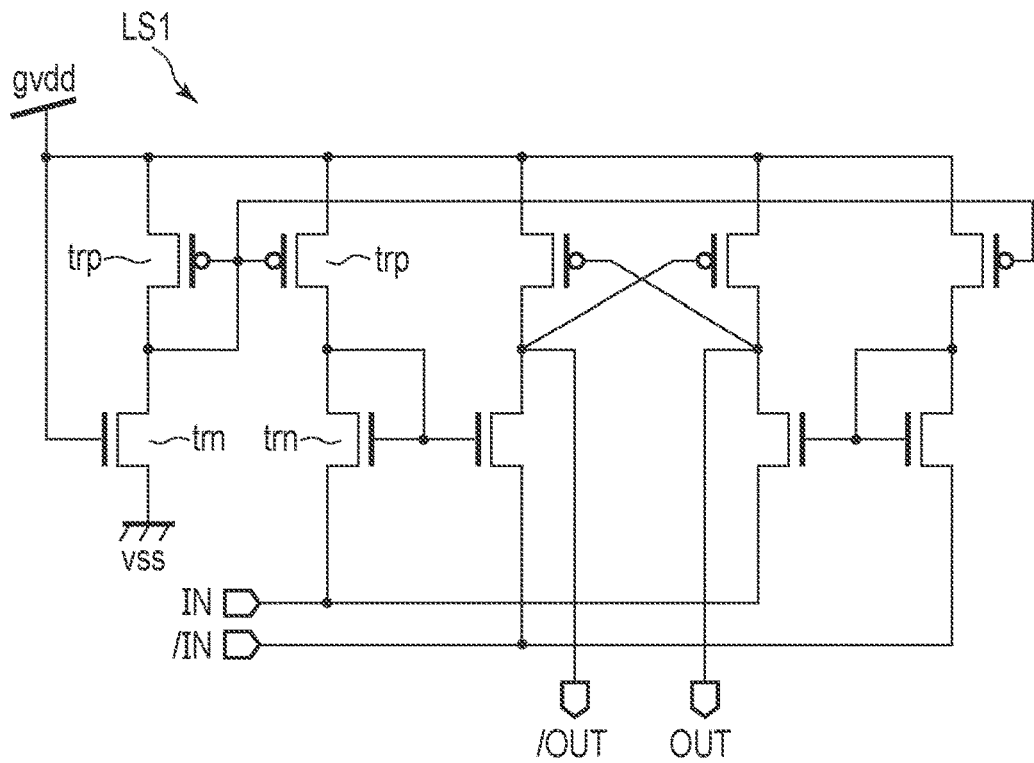
FIG. 16 is a circuit diagram showing a part of the level shift circuit according to modified example 2 of the embodiment, illustrating a first level shift unit.
Figure 17:
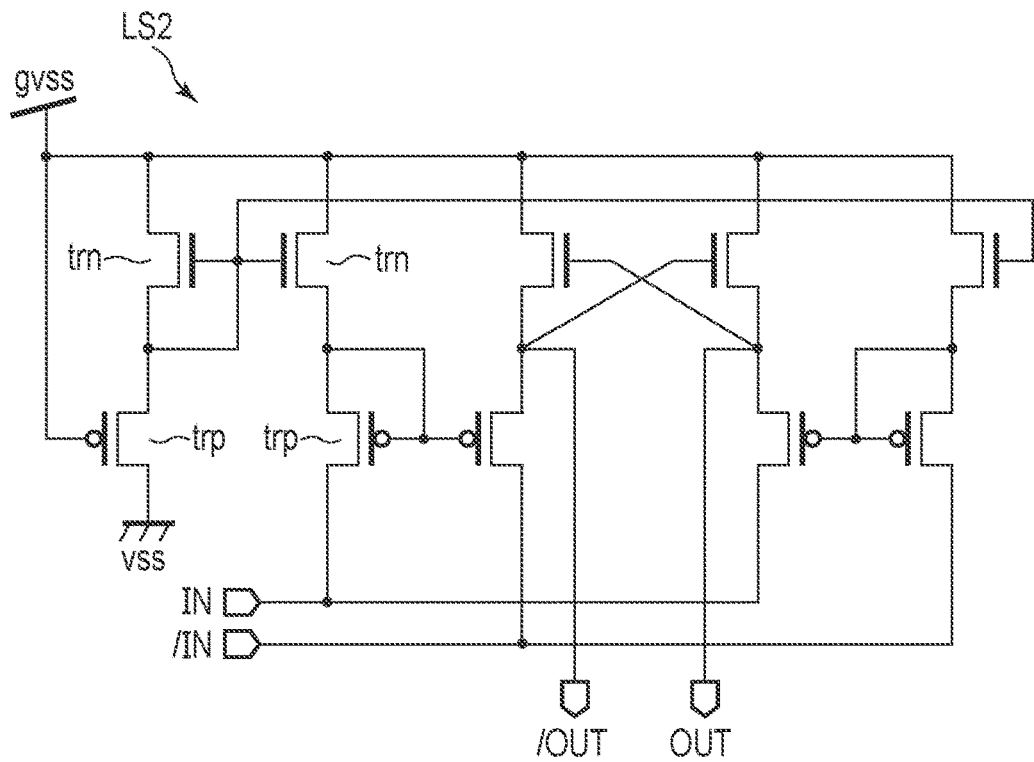
FIG. 17 is a circuit diagram showing a part of the level shift circuit according to modified example 2 of the embodiment, illustrating a second level shift unit.

Next, modified example 2 of the above-described embodiment will be described. FIG. 16 is a circuit diagram showing a part of the level shift circuit LSC according to modified example 2, illustrating the first level shift unit LS1. FIG. 17 is a circuit diagram showing a part of the level shift circuit LSC according to modified example 2, illustrating the second level shift unit LS2. The electronic device 100 is configured in the same manner as the above-described embodiment except for constituent elements to be described in modified example 2.

As shown in FIG. 16, the first level shift unit LS1 may be configured. An input terminal (IN) of the first level shift unit LS1 is electrically connected to the first input terminal Ti1. The other input terminal (/IN) of the first level shift unit LS1 is electrically connected to the first input terminal Ti1 via an odd number of inverters. The input terminal (/IN) of the first level shift unit LS1 may not be electrically connected to the first input terminal Ti1. For example, the signal line S electrically connected to the input terminal (IN) and the signal line S electrically connected to the input terminal (/IN) may be different from each other.

The first output voltage gvdd and the second power supply voltage vss are further supplied to the first level shift unit LS1. The output terminals (OUT and /OUT) of the first level shift unit LS1 are electrically connected to the first inverter IV1.

The second level shifting unit LS2 is also configured in the same manner as the first level shift unit LS1 shown in FIG. 16.

As shown in FIG. 17, the second level shift unit LS2 may be configured. The input terminal (IN) of the second level shift unit LS2 is electrically connected to the first input terminal Ti1. The other input terminal (/IN) of the second level shift unit LS2 is electrically connected to the first input terminal Ti1 via an odd number of inverters. The input terminal (/IN) of the second level shift unit LS2 may not be electrically connected to the first input terminal Ti1. For example, the signal line S electrically connected to the input terminal (IN) and the signal line S electrically connected to the input terminal (/IN) may be different from each other.

The second output voltage gvss and the second power supply voltage vss are further supplied to the second level shift unit LS2. The output terminals (OUT and /OUT) of the second level shift unit LS2 are electrically connected to the second inverter IV2.

The same advantages as those of the above-described embodiment can also be obtained from modified example 2 configured as described above.

Modified Example 3

Next, modified example 3 of the above-described embodiment will be described. FIG. 18 is a circuit diagram showing a part of the level shift circuit LSC according to modified example 3, illustrating the main part P1c of the first level shift unit LS1. FIG. 19 is a circuit diagram showing a part of the level shift circuit LSC according to modified example 3, illustrating the main part P2c of the second level shift unit LS2. The electronic device 100 is configured in the same manner as the above-described embodiment except for constituent elements to be described in modified example 3.

As shown in FIG. 18, the main part P1c of the first level shift unit LS1 may be configured. The main part P1c is a differential type level shifter (L/S). A voltage Vref1 is applied to a gate electrode of an N-channel TFT trn3. Vref1 is set to +2V such that TFT trn3 is slightly turned on. The gate electrode of TFT trn1 is electrically connected to the front stage part P1a.

When the voltage level input from the front stage part P1a to the gate electrode of TFT trn1 is a low (L) level, TFT trn1 becomes an off state. The potential of the gate electrode of the P-channel TFT trp1 rises until TFT trp1 becomes an off state. For this reason, TFT trp2 also becomes an off state and TFT trn2 becomes an on state. The second power supply voltage vss is output to the output terminal (OUT) of the main part P1c.

In contrast, when the voltage level input from the front stage part P1a to the gate electrode of TFT trn1 is a high (H) level, the potential of the drain electrode of TFT trn3 rises until currents Ids of TFT trn1 and TFT trn3 become equal, and the equal current Ids also flows to TFT trp1. Therefore, a shoot-through current flows. As a result, TFT trp2 becomes an on state and TFT trn2 becomes an off state. Therefore, the first output voltage gvdd is output to the output terminal (OUT) of the main part P1c.

As shown in FIG. 19, the main part P2c of the second level shift unit LS2 is configured. The main part P2c is a differential type level shifter (L/S), and corresponds to the second output voltage gvss side in terms of the second power supply voltage vss. A voltage Vref2 is applied to a gate electrode of a P-channel TFT trp5. Vref2 is set to −2V. The operation of the main part P2c is the same as the operation of the main part P1c on the first output voltage gvdd side in terms of the second power supply voltage vss.

The same advantages as those of the above-described embodiment can also be obtained from modified example 3 configured as described above.

Modified Example 4

Next, modified example 4 of the above-described embodiment will be described. FIG. 20 is a circuit diagram showing a part of the level shift circuit LSC according to modified example 4, illustrating the first level shift unit LS1. The electronic device 100 is configured in the same manner as the above-described embodiment except for constituent elements to be described in modified example 4.

As shown in FIG. 20, the first level shift unit LS1 may be configured. An input terminal (IN) of the first level shift unit LS1 is electrically connected to the first input terminal Ti1. The other input terminal (/IN) of the first level shift unit LS1 is electrically connected to the first input terminal Ti1 via an odd number of inverters. The input terminal (/IN) of the first level shift unit LS1 may not be electrically connected to the first input terminal Ti1. For example, the signal line S electrically connected to the input terminal (IN) and the signal line S electrically connected to the input terminal (/IN) may be different from each other.

A voltage VBIAS is applied to a gate electrode of an N-channel TFT trn3. For example, the voltage VBIAS can be applied to the gate electrode of TFT trn3 via the signal line S.

The second level shift unit LS2 is also configured in the same manner as the first level shift unit LS1 shown in FIG. 20.

The same advantages as those of the above-described embodiment can also be obtained from modified example 4 configured as described above.

The circuit configurations of the first level shift unit LS1 and the second level shift unit LS2 are not limited to the circuit configurations of the above-described embodiment and modified examples 1 to 4, but can be variously modified.

Next, several modified examples of the circuit configuration of the level shift circuit LSC will be described. The voltages (signals) input to the level shift circuit LSC are not limited to the above-described examples, but can be variously modified.

Modified Example 5

Figure 22:
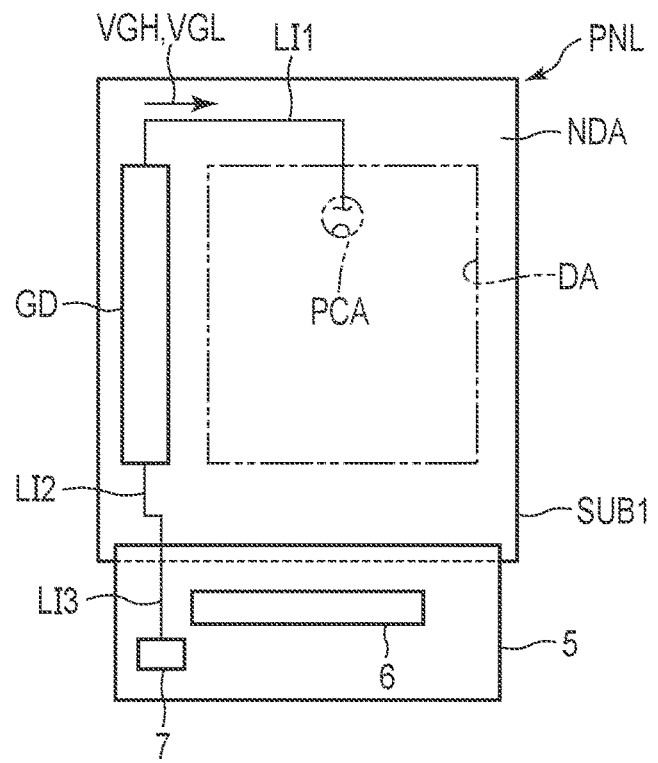
FIG. 22 is a plan view showing a liquid crystal display panel, a wiring substrate, an IC chip, and a power supply circuit according to the modified example 5.

Next, modified example 5 of the above-described embodiment will be described. FIG. 21 is a circuit diagram showing the level shift circuit LSC according to modified example 5. FIG. 22 is a plan view showing the liquid crystal display panel PNL, a wiring substrate 5, an IC chip 6, and a power supply circuit 7 according to modified example 5. The electronic device 100 is configured in the same manner as the above-described embodiment except for constituent elements to be described in modified example 5.

As shown in FIG. 21, the first output voltage gvdd input to the level shift circuit LSC may be a gate-high voltage VGH of +8V. The second output voltage gvss input to the level shift circuit LSC may be a gate-low voltage VGL of −8V. Thus, the level shift circuit LSC can use the gate-high voltage VGH and the gate-low voltage VGL to drive the scanning line G. The voltage level applied to the control electrode RL (the control electrode structure RE) by the level shift circuit LSC is −8V, ground level (essentially 0V), and +8V.

As shown in FIG. 22, the scanning line driving circuit GD outputs the gate-high voltage VGH and the gate-low voltage VGL to the level shift circuit LSC in the incident light control area PCA. The incident light control area PCA is the closest to an upper side of the display area DA. For this reason, a wiring line group LI1 connecting the scanning line driving circuit GD and the level shift circuit LSC extends an area above the display area DA in the non-display area NDA. Thus, the distance of the wiring line group LI1 inside the display area DA can be shortened as compared with a case where the entire wiring line group LI1 extends in parallel with the scanning line G.

The electronic device 100 comprises the power supply circuit 7. The power supply circuit 7 is mounted on, for example, the wiring substrate 5. The power supply circuit 7 outputs the gate-high voltage VGH and the gate-low voltage VGL. The scanning line driving circuit GD and the power supply circuit 7 are electrically connected via a wiring line group LI2 and a wiring line group LI3. The wiring group LI2 is formed on the first substrate SUB1 (liquid crystal display panel PNL) and is electrically connected to a group of outer lead bonding pads of the first substrate SUB1, and the scanning line driving circuit GD. The wiring line group LI3 is formed on the wiring substrate 5, and is electrically connected to the above pad group and the power supply circuit 7.

The same advantages as those of the above-described embodiment can also be obtained from modified example 5 configured as described above.

Modified Example 6

Figure 23:
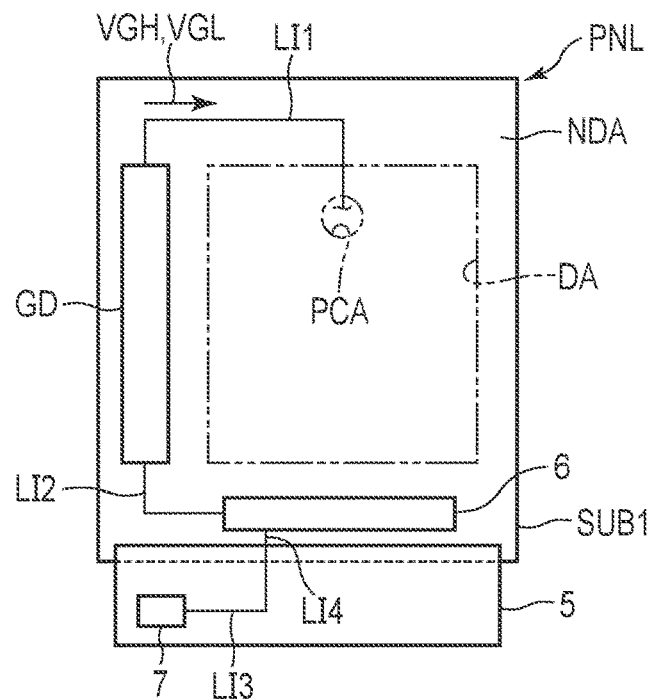
FIG. 23 is a plan view showing the liquid crystal display panel, the wiring substrate, the IC chip, and the power supply circuit according to modified example 6 of the embodiment.

Next, modified example 6 of the above-described embodiment will be described. FIG. 23 is a plan view showing the liquid crystal display panel PNL, a wiring substrate 5, an IC chip 6, and a power supply circuit 7 according to modified example 6. The electronic device 100 is configured in the same manner as the above-described modified example 5 except for constituent elements to be described in modified example 6.

As shown in FIG. 23, the IC chip 6 is mounted on the first substrate SUB1 (the liquid crystal display panel PNL). The IC chip 6 is located in an area below the display area DA, in the non-display area NDA. The gate-high voltage VGH and the gate-low voltage VGL may be supplied to the scanning line driving circuit GD via the IC chip 6.

The scanning line driving circuit GD and the power supply circuit 7 are electrically connected via the wiring line group LI2, the wiring line group LI3, the wiring line group LI4, and the like. The wiring line group LI2 is formed on the first substrate SUB1 (liquid crystal display panel PNL) and is electrically connected to the IC chip 6 and the scanning line driving circuit GD. The wiring line group LI3 is formed on the wiring substrate 5 and is electrically connected to the group of the pads of the first substrate SUB1 and the power supply circuit 7. The wiring group LI4 is formed on the first substrate SUB1 (liquid crystal display panel PNL) and is electrically connected to the above group of the pads and the IC chip 6.

The same advantages as those of the above-described embodiment can also be obtained from modified example 6 configured as described above.

Modified Example 7

Figure 24:
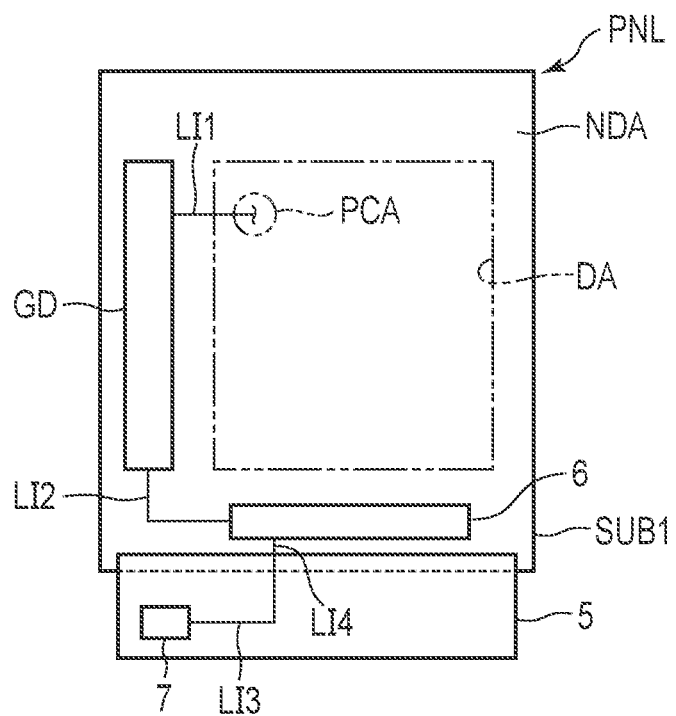
FIG. 24 is a plan view showing the liquid crystal display panel, the wiring substrate, the IC chip, and the power supply circuit according to modified example 7 of the embodiment.

Next, modified example 7 of the above-described embodiment will be described. FIG. 24 is a plan view showing the liquid crystal display panel PNL, a wiring substrate 5, an IC chip 6, and a power supply circuit 7 according to modified example 7. The electronic device 100 is configured in the same manner as the above-described modified example 6 except for constituent elements to be described in modified example 7.

As shown in FIG. 24, the incident light control area PCA is the closest to a left side of the display area DA. For this reason, the wiring line group LI1 connecting the scanning line driving circuit GD and the level shift circuit LSC extends an area on a left side of the display area DA, in the non-display area NDA. The wiring line group LI1 extends in parallel with the scanning line G. The total length of the wiring line group LI1 can be shortened, and the distance of the wiring line group LI1 inside the display area DA can be shortened.

The same advantages as those of the above-described embodiment can also be obtained from modified example 7 configured as described above.

Modified Example 8

Figure 25:
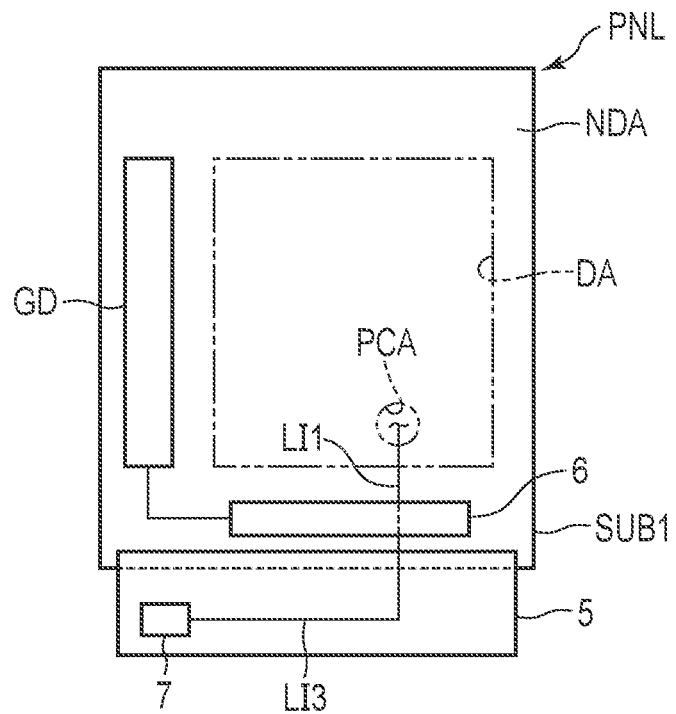
FIG. 25 is a plan view showing the liquid crystal display panel, the wiring substrate, the IC chip, and the power supply circuit according to modified example 8 of the embodiment.

Next, modified example 8 of the above-described embodiment will be described. FIG. 25 is a plan view showing the liquid crystal display panel PNL, a wiring substrate 5, an IC chip 6, and a power supply circuit 7 according to modified example 8. The electronic device 100 is configured in the same manner as the above-described modified example 5 except for constituent elements to be described in modified example 8.

As shown in FIG. 25, the gate-high voltage VGH and the gate-low voltage VGL may be supplied to the level shift circuit LSC in the incident light control area PCA without passing through the scanning line driving circuit GD or the IC chip 6.

The level shift circuit LSC and the power supply circuit 7 are electrically connected via the wiring line group LI1, the wiring line group LI3, and the like. The wiring line group LI1 is formed on the first substrate SUB1 (liquid crystal display panel PNL) and is electrically connected to the level shift circuit LSC and the group of the pads of the first substrate SUB1. The wiring line group LI3 is formed on the wiring substrate 5 and is electrically connected to the group of the pads of the first substrate SUB1 and the power supply circuit 7.

The incident light control area PCA is the closest to a lower side of the display area DA. For this reason, the wiring line group LI1 extends an area below the display area DA, in the non-display area NDA. In addition, the wiring line group LI1 passes below the IC chip 6. In other words, the wiring line group LI1 passes between the insulating substrate 10 of the first substrate SUB1 and the IC chip 6.

The same advantages as those of the above-described embodiment can also be obtained from modified example 8 configured as described above.

While the embodiments and modified examples have been described, the embodiments and the modified examples have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-mentioned technologies is not limited to the application to the above-described liquid crystal display panel PNL, but may be applied to the other liquid crystal display panels and to various display panels comprising the level shift circuit LSC.

In addition, the above-described technologies is not limited to the application to the above-described electronic device 100, but may be applied to various electronic devices.

What is claimed is:

1. A level shift circuit comprising:
a first input terminal;
a second input terminal;
an output terminal;

a first level shift circuit which, when a first power supply voltage more positive than a reference voltage is input from the first input terminal, outputs a first output voltage more positive than the reference voltage and which, when the reference voltage or a second power supply voltage more negative than the reference voltage is input from the first input terminal, outputs the reference voltage;

a first inverter which outputs the reference voltage when the first output voltage is input from the first level shift circuit and which outputs the first output voltage when the reference voltage is input from the first level shift circuit;

a first switching transistor which permits the first output voltage to be output to the output terminal when the reference voltage is input from the first inverter and which prohibits the first output voltage to be output to the output terminal when the first output voltage is input from the first inverter;

a second level shift circuit which outputs the reference voltage when the reference voltage or the first power supply voltage is input from the first input terminal and which outputs a second output voltage more negative than the reference voltage when the second power supply voltage is input from the first input terminal;

a second inverter which outputs the second output voltage when the reference voltage is input from the second level shift circuit and which outputs the reference voltage when the second output voltage is input from the second level shift circuit;

a second switching transistor which permits the second output voltage to be output to the output terminal when the reference voltage is input from the second inverter and which prohibits the second output voltage to be output to the output terminal when the second output voltage is input from the second inverter;

a third switching transistor which is connected between the second input terminal and the output terminal, which permits the reference voltage to be output from the second input terminal to the output terminal when the first output voltage is input from the first inverter, and which prohibits the reference voltage to be output from the second input terminal to the output terminal when the reference voltage is input from the first inverter; and a fourth switching transistor which is serially connected between the second input terminal and the output terminal together with the third switching transistor, which permits the reference voltage to be output from the second input terminal to the output terminal when the second output voltage is input from the second inverter, and which prohibits the reference voltage to be output from the second input terminal to the output terminal when the reference voltage is input from the second inverter, the first switching transistor which is a P-channel transistor and includes a first gate electrode to which the first output voltage or the reference voltage is input from the first inverter, the second switching transistor which is an N-channel transistor and includes a second gate electrode to which the second output voltage or the reference voltage is input from the second inverter, the third switching transistor which is an N-channel transistor and includes a third gate electrode to which the first output voltage or the reference voltage is input from the first inverter, the fourth switching transistor which is a P-channel transistor and includes a fourth gate electrode to which the second output voltage or the reference voltage is input from the second inverter.

2. The level shift circuit of claim 1, wherein
an absolute value of the first output voltage is larger than an absolute value of the first power supply voltage, and
an absolute value of the second output voltage is larger than an absolute value of the second power supply voltage.

3. The level shift circuit of claim 1, wherein
a level of the reference voltage is a ground level.

4. A display panel comprising:
a plurality of scanning lines;
a plurality of signal lines;
a control switching transistor connected to a corresponding scanning line of the plurality of scanning lines and a corresponding signal line of the plurality of signal lines;
a control electrode; and
a level shift circuit connected between the control switching transistor and the control electrode,
the level shift circuit comprising:
a first input terminal connected to the control switching transistor;
a second input terminal;
an output terminal connected to the control electrode;
a first level shift circuit which, when a first power supply voltage more positive than a reference voltage is input from the first input terminal, outputs a first output voltage more positive than the reference voltage and which, when the reference voltage or a second power supply voltage more negative than the reference voltage is input from the first input terminal, outputs the reference voltage;
a first inverter which outputs the reference voltage when the first output voltage is input from the first level shift circuit and which outputs the first output voltage when the reference voltage is input from the first level shift circuit;
a first switching transistor which permits the first output voltage to be output to the output terminal when the reference voltage is input from the first inverter and which prohibits the first output voltage to be output to the output terminal when the first output voltage is input from the first inverter;
a second level shift circuit which outputs the reference voltage when the reference voltage or the first power supply voltage is input from the first input terminal and which outputs a second output voltage more negative than the reference voltage when the second power supply voltage is input from the first input terminal;
a second inverter which outputs the second output voltage when the reference voltage is input from the second level shift circuit and which outputs the reference voltage when the second output voltage is input from the second level shift circuit;
a second switching transistor which permits the second output voltage to be output to the output terminal when the reference voltage is input from the second inverter and which prohibits the second output voltage to be output to the output terminal when the second output voltage is input from the second inverter;
a third switching transistor which is connected between the second input terminal and the output terminal, which permits the reference voltage to be output from the second input terminal to the output terminal when the first output voltage is input from the first inverter, and which prohibits the reference voltage to be output from the second input terminal to the output terminal when the reference voltage is input from the first inverter;

a fourth switching transistor which is serially connected between the second input terminal and the output terminal together with the third switching transistor, which permits the reference voltage to be output from the second input terminal to the output terminal when the second output voltage is input from the second inverter, and which prohibits the reference voltage to be output from the second input terminal to the output terminal when the reference voltage is input from the second inverter, the first switching transistor which is a P-channel transistor and includes a first gate electrode to which the first output voltage or the reference voltage is input from the first inverter, the second switching transistor which is an N-channel transistor and includes a second gate electrode to which the second output voltage or the reference voltage is input from the second inverter, the third switching transistor which is an N-channel transistor and includes a third gate electrode to which the first output voltage or the reference voltage is input from the first inverter, the fourth switching transistor which is a P-channel transistor and includes a fourth gate electrode to which the second output voltage or the reference voltage is input from the second inverter.

5. The display panel of claim 4, wherein
an absolute value of the first output voltage is larger than an absolute value of the first power supply voltage, and
an absolute value of the second output voltage is larger than an absolute value of the second power supply voltage.

6. The display panel of claim 4, wherein
a level of the reference voltage is a ground level.

7. The display panel of claim 4, further comprising:
a plurality of pixels,
wherein
each of the plurality of pixels includes:
a pixel switching transistor connected to a corresponding scanning line of the plurality of scanning lines and a corresponding signal line of the plurality of signal lines; and
a pixel electrode connected to the pixel switching transistor.

8. The display panel of claim 7, wherein
the signal line connected to the control switching transistor is identical as the signal line connected to the pixel switching transistor of a pixel of the plurality of pixels.

9. The display panel of claim 4, wherein
the control switching transistor switches outputting or not outputting the first power supply voltage, the second power supply voltage, and the reference voltage input from the signal line to the level shift circuit, and
the level shift circuit selectively applies the first output voltage, the second output voltage, and the reference voltage to the control electrode.

10. The display panel of claim 4, further comprising:
an incident light control area including both a first incident light control area where a quantity of transmitted light is adjustable and a light-shielding area,
wherein the control electrode is located in the first incident light control area, and
the level shift circuit is located in the light-shielding area.

11. An electronic device comprising:
a display panel comprising a plurality of scanning lines, a plurality of signal lines, an incident light control area, a control switching transistor connected to a corresponding scanning line of the plurality of scanning lines and a corresponding signal line of the plurality of signal lines, a control electrode located in the incident light control area, and a level shift circuit connected to the control switching transistor and the control electrode; and
an imaging device acquiring information of light transmitted through the incident light control area of the display panel,
the level shift circuit comprising:
a first input terminal connected to the control switching transistor;
a second input terminal;
an output terminal connected to the control electrode;
a first level shift circuit which, when a first power supply voltage more positive than a reference voltage is input from the first input terminal, outputs a first output voltage more positive than the reference voltage and which, when the reference voltage or a second power supply voltage more negative than the reference voltage is input from the first input terminal, outputs the reference voltage;
a first inverter which outputs the reference voltage when the first output voltage is input from the first level shift circuit and which outputs the first output voltage when the reference voltage is input from the first level shift circuit;
a first switching transistor which permits the first output voltage to be output to the output terminal when the reference voltage is input from the first inverter and which prohibits the first output voltage to be output to the output terminal when the first output voltage is input from the first inverter;
a second level shift circuit which outputs the reference voltage when the reference voltage or the first power supply voltage is input from the first input terminal and which outputs a second output voltage more negative than the reference voltage when the second power supply voltage is input from the first input terminal;
a second inverter which outputs the second output voltage when the reference voltage is input from the second level shift circuit and which outputs the reference voltage when the second output voltage is input from the second level shift circuit;
a second switching transistor which permits the second output voltage to be output to the output terminal when the reference voltage is input from the second inverter and which prohibits the second output voltage to be output to the output terminal when the second output voltage is input from the second inverter;
a third switching transistor which is connected between the second input terminal and the output terminal, which permits the reference voltage to be output from the second input terminal to the output terminal when the first output voltage is input from the first inverter, and which prohibits the reference voltage to be output from the second input terminal to the output terminal when the reference voltage is input from the first inverter; and a fourth switching transistor which is serially connected between the second input terminal and the output terminal together with the third switching transistor, which permits the reference voltage to be output from the second input terminal to the output terminal when the second output voltage is input from the second inverter, and which prohibits the reference voltage to be output from the second input terminal to the output terminal when the reference voltage is input from the second inverter, the first switching transistor which is a P-channel transistor and includes a first gate electrode to which the first output voltage or the reference voltage is input from the first inverter, the second switching transistor which is an N-channel transistor and includes a second gate electrode to which the second output voltage or the reference voltage is input from the second inverter, the third switching transistor which is an N-channel transistor and includes a third gate electrode to which the first output voltage or the reference voltage is input from the first inverter, the fourth switching transistor which is a P-channel transistor and includes a fourth gate electrode to which the second output voltage or the reference voltage is input from the second inverter.

12. The electronic device of claim 11, wherein an absolute value of the first output voltage is larger than an absolute value of the first power supply voltage, and an absolute value of the second output voltage is larger than an absolute value of the second power supply voltage.

13. The electronic device of claim 11, wherein
a level of the reference voltage is a ground level.

14. The electronic device of claim 11, wherein
the display panel further comprises a display area and a plurality of pixels located in the display area, and each of the plurality of pixels includes:

a pixel switching transistor connected to a corresponding scanning line of the plurality of scanning lines and a corresponding signal line of the plurality of signal lines; and a pixel electrode connected to the pixel switching transistor.

15. The electronic device of claim 14, wherein
the signal line connected to the control switching transistor is identical as the signal line connected to the pixel switching transistor of a pixel of the plurality of pixels.

16. The electronic device of claim 11, wherein
the control switching transistor switches outputting or not outputting the first power supply voltage, the second power supply voltage, and the reference voltage input from the signal line to the level shift circuit, and the level shift circuit selectively applies the first output voltage, the second output voltage, and the reference voltage to the control electrode.

17. The electronic device of claim 11, wherein
the incident light control area includes a first incident light control area where a quantity of transmitted light is adjustable and a light-shielding area, the control electrode is located in the first incident light control area, and the level shift circuit is located in the light-shielding area.

* * * * *